United States Patent [19]
McMahon et al.

[11] Patent Number: 5,758,062
[45] Date of Patent: May 26, 1998

[54] METHOD AND APPARATUS FOR REGRESSION TESTING OF APPLICATION LOGIC

[75] Inventors: Douglas James McMahon, Belmont; George Buzsaki, Fremont, both of Calif.

[73] Assignee: Oracle Corporation, Redwood Shores, Calif.

[21] Appl. No.: 640,247

[22] Filed: Apr. 30, 1996

[51] Int. Cl.$^6$ .................................................. G06F 11/263
[52] U.S. Cl. ........................... 395/183.14; 395/183.14; 395/183.21
[58] Field of Search .................. 395/183.14, 183.13, 395/183.15, 185.02, 183.21, 183.09; 364/193

[56] References Cited

U.S. PATENT DOCUMENTS

| | | | |
|---|---|---|---|
| 5,022,028 | 6/1991 | Edmonds et al. | 371/25.1 |
| 5,153,886 | 10/1992 | Tuttle | 371/67.1 |
| 5,157,782 | 10/1992 | Tuttle et al. | 395/575 |
| 5,218,605 | 6/1993 | Low et al. | 371/16.1 |
| 5,335,341 | 8/1994 | Chana | 395/183.13 |
| 5,335,342 | 8/1994 | Pope et al. | 395/575 |
| 5,490,249 | 2/1996 | Miller | 395/183.14 |
| 5,502,815 | 3/1996 | Cozza | 395/183.14 |
| 5,511,185 | 4/1996 | Weinbaum et al. | 395/183.14 |
| 5,513,315 | 4/1996 | Tierney et al. | 395/183.14 |
| 5,598,333 | 1/1997 | Marsico, Jr. | 395/183.14 |
| 5,600,789 | 2/1997 | Parker et al. | 395/183.14 |
| 5,652,835 | 7/1997 | Miller | 395/183.14 |
| 5,673,387 | 9/1997 | Chen et al. | 395/183.14 |
| 5,694,540 | 12/1997 | Humelsine et al. | 395/183.14 |

OTHER PUBLICATIONS

IBM Technical Disclosure Bulletin, "Regression Testing", vol. 29, pp. 2514–2516, Nov. 1986.
IBM Technical Disclosure Bulletin, "Intercepting Telnet Data", vol. 36, pp. 505–508, Jun. 1993.

*Primary Examiner*—Robert W. Beausoliel, Jr.
*Assistant Examiner*—Scott T. Baderman
*Attorney, Agent, or Firm*—Wagner, Murabito & Hao

[57] ABSTRACT

A method and system for regression testing of application logic within a software system. Software architecture can be separated into a presentation layer (e.g., user interface), an application layer (e.g., business logic), and a data/storage layer. Within the novel testing system, communication interfaces between the presentation layer and the application layer are identified such that user initiated commands ("events") passed from the presentation layer to the application layer are recorded into a test playback event file. During test playback event recordation, differences in the state of the application layer of a reference program are collected into a reference state log file. To test a program, the recorded events of the test playback event file are played back and applied directly to its application layer. After each event, the differences in the state of the program are collected into a test state log file. The reference and test state log files are compared and differences are stored in an error or summary difference file. By recording events that enter the application layer, in lieu of the user entered commands that enter the presentation layer, the novel testing system is insensitive to changes in the presentation layer and allows more direct testing and error detection of the application layer. By recording differences in the state of the application layer on an event by event basis, in lieu of recording differences in information presented to the user, the novel system allows more effective error detection and error isolation of the application layer.

30 Claims, 19 Drawing Sheets

METHOD AND APPARATUS FOR REGRESSION TESTING OF APPLICATION LOGIC

TECHNICAL FIELD

The present invention relates to the field of software testability. More specifically, the present invention relates to the field of software regression testing.

BACKGROUND ART

Computer software products require testing to ensure high product quality. Unlike most manufactured products, typically all copies of a software product should be identical, and there is no tolerance for variances in the software product. It is crucial that the capabilities of a single copy of the software be fully tested prior to its release. Tests are almost always repeated on subsequent releases of the software product to ensure that changes and enhancements between software versions have not caused "regression" of previous features (e.g., they become eliminated or rendered inoperable). A regression test consists of: (1) a recorded series of user derived actions which can be played back into a software system under test; and (2) a control output which represents the correct output of the software in response to the recorded actions. To reduce development costs, regression testing is typically automated.

FIG. 1 illustrates a widely used prior art approach 10 for software system regression testing that focuses almost entirely on the presentation layer 16 of the software system under test. The presentation layer 16 consists of the software layers that interface with the user (e.g., this layer receives and presents user information). Well known graphic user interfaces (GUIs), including various interface objects, are included within the presentation layer 16. In approach 10, the user interface events, such as mouse clicks, keystrokes, etc., are received from input device 12 over line 30a and are recorded into a test record/playback file 14. The presentation layer 16 also generates control output which is transmitted over line 30b and is rendered on the output device 26 (e.g., screen display, hardcopy device, etc.). The control output consists of user interface display information that is produced in response to the user interface events applied to a first software program. The control output, transmitted over line 30b, is recorded in the output record and compare file 24. During a later regression test of a second software program, the recorded user interface events from file 14 are played back, applied to the inputs of the presentation layer 16, and test output over 30b is recorded and compared against the previously recorded control output to locate variations therein.

The approach of FIG. 1 is useful for software systems having the bulk of their complex operations within the presentation layer 16. However, the application layer 18 is only tested indirectly by approach 10, through the user interface events of the presentation layer 16.

Approach 10 has the drawback that the application layer 18 is not tested directly, but rather is tested indirectly via the inputs and outputs of the presentation layer 16. The only information recorded for test verification is that information presented to the user (e.g., on device 26). However, errors within the application layer that process a particular user interface event received over line 30a may not manifest themselves in output data (over 30b) until many events later in time. This time decoupling between a user action, the error process, and error manifestation disadvantageously increases the difficulty in detecting and isolating the cause of application layer 18 errors.

Another drawback of approach 10 is that the testing system is very sensitive to minor changes and customizations in the presentation layer 16 from the time the control output was recorded to the time a subsequent regression test is performed. Any small change in the presentation layer 16 that causes any change in the information displayed on device 26 will create volumes of mismatches between the control output and the test output, thus invalidating the regression test. Due to this, a high degree of test maintenance on the regression test must be performed in approach 10 whenever the presentation layer is altered in any fashion.

A major drawback of the prior art "presentation layer" approach 10 is that the recorded control output and test output, transmitted over line 30b, are typically not formatted in any particular form that lends itself to comparison. Rather, the control and test outputs are formatted for viewing and user comprehension via device 26 and are not formatted for computer searching/comparison procedures. Therefore, during a regression test, a large amount of storage and processing capacity is consumed in recording the volume of user interface based test output produced at 30b in order to compare it against previously recorded user interface based control output.

Some prior art variations to approach 10 of FIG. 1 attempt to create user defined screen display areas which are used to define specific output informations (from 30b) to record in an effort to decrease the output information collected and compared. The defined screen areas are those that are particularly interesting for gathering important control information. However, information not displayed in these screen areas is ignored by the output recorder and comparator file 24. This variation to approach 10 is not advantageous because it forces the user to perform the arduous and tedious task of identifying numerous screen areas for each different type of user information that can be displayed on device 26. The user is, in effect, given the difficult task of determining which screen areas best manifest the presence of software errors and which do not. Unfortunately, certain errors may not be detected if they are manifested by information displayed within screen areas that do not happen to be included by the user. What is needed is a testing system that does not require the learning of special test commands or test initialization procedures for operation.

Because the testing system of approach 10 is sensitive to the content of the presentation layer 16, another drawback of approach 10 is that the regression tests are not portable across different systems that utilize different presentation layers 16. For instance, in order to test an identical application layer 18 that exists within systems having different presentation layers 16, two entirely different sets of regression tests need to be developed and used.

Another drawback of approach 10 of FIG. 1 is that the information output over line 30b is not formatted in a structured form, but is rather formatted for user comprehension. Not only does this require recordation of volumes of test and control output, but additionally, these user interface based formats are not readily adapted for use with sophisticated searching procedures. It is desirable to use sophisticated searching procedures to locate and ignore irrelevant differences between the control output and the test output.

The volume of recorded information over line 30a (e.g., user commands) and over line 30b (e.g., screen dumps) of approach 10 not only requires high capacity storage units to record the information, but also disadvantageously requires longer comparison procedures to determine differences between the control and test outputs. One other drawback of the approach 10 is that the user interface events recorded over line 30a are difficult to interpret for test editing. These user interface events are at such a low level (e.g., mouse movements, keystrokes, etc.) they typically do not clearly represent, to a skilled test editor, the application layer functions that they invoke.

Accordingly, what is needed is a regression testing system that is more tightly coupled to the application layer of the software programs. A test system is needed that directly tests the application layer of the software system such that error manifestations are closely coupled in time with (1) the input event that caused the error to be manifested and (2) the output manifestation of the error. A testing system is also needed that is insensitive to changes in the presentation layer and is readily portable between various presentation layers. A test system is further needed that does not require arduous and tedious screen position definitions for operation, but operates using the normal operational functions of the software program under test and does not require learning of special test commands and/or test initialization procedures. A test system is also needed that outputs information in a highly structured format usable by sophisticated searching procedures to effectively locate differences and ignore irrelevant mismatches. It is also desired to provide a test system that does not record or process large volumes of user interface events or screen formatted output information for operation. A test system is further needed that records events that are not low level user interface based events but are higher level events readily comprehensible during manual test editing. The present invention regression testing system satisfies the above needs and others not specifically recited above but apparent from the below discussions.

SUMMARY OF THE INVENTION

A method and system are described for regression testing of application logic within a software system. Software architecture can be separated into a presentation layer (e.g., user interface), an application layer (e.g., business logic), and a data/storage layer. Within the testing system of the present invention, communication interfaces between the presentation layer and the application layer are identified such that user derived commands ("events") passed from the presentation layer to the application layer are recorded into a test playback event file. During test playback event recordation, differences in the state of a first software program are collected into a reference state log file. To test the application layer of a second software program, the recorded events of the test playback event file are played back and applied directly to its application layer. After each event, the differences in the state of the second software program are collected into a test state log file. The reference and test state log files are compared and differences are stored in an error or summary difference file. By recording events that enter the application layer, in lieu of the user entered commands that enter the presentation layer, the testing system of the present invention is insensitive to changes in the presentation layer and allows more direct application of events to the application layer. By recording differences in the state of the application layer on an event by event basis, in lieu of recording differences in information presented to the user, the testing system of the present invention also allows more effective error detection and error isolation of the application layer.

Specifically, embodiments of the present invention are implemented in a computer system having a processor and a computer readable memory, and include a method of performing a regression test having the computer implemented steps of: a) recording application events into a playback event file, the application events originating from a presentation layer and passed to an application layer of a software program; b) recording a first response of the software program to the application events and storing the first response in the computer readable memory; c) replaying the playback file and directly applying the application events stored therein to an application layer of a modified version of the software program without interaction with the presentation layer; d) recording a second response, the second response being a response of the modified version of the software program to the application events; and e) comparing the first response and the second response to determine differences therein. Embodiments of the present invention further include a computer system and computer readable memory unit implemented in accordance with the above.

BRIEF DESCRIPTION OF THE DRAWINGS

FIG. 2A illustrates software architecture of the present invention divided into presentation, application and data/storage layers having identifiable communication interfaces there between.

DETAILED DESCRIPTION OF THE DRAWINGS

NOTATION AND NOMENCLATURE

Some portions of the detailed description which follow are presented in terms of procedures, logic blocks, processing, and other symbolic representations of operations on data bits within a computer memory (e.g., "computer logic"). These descriptions and representations are the means used by those skilled in the data processing arts to most effectively convey the substance of their work to others skilled in the art. A procedure, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's readable registers and memories into other data similarly represented as physical quantities within the computer system memories or registers or other such information storage, transmission or display devices.

ARCHITECTURE OF SOFTWARE SYSTEM

Figure 1:
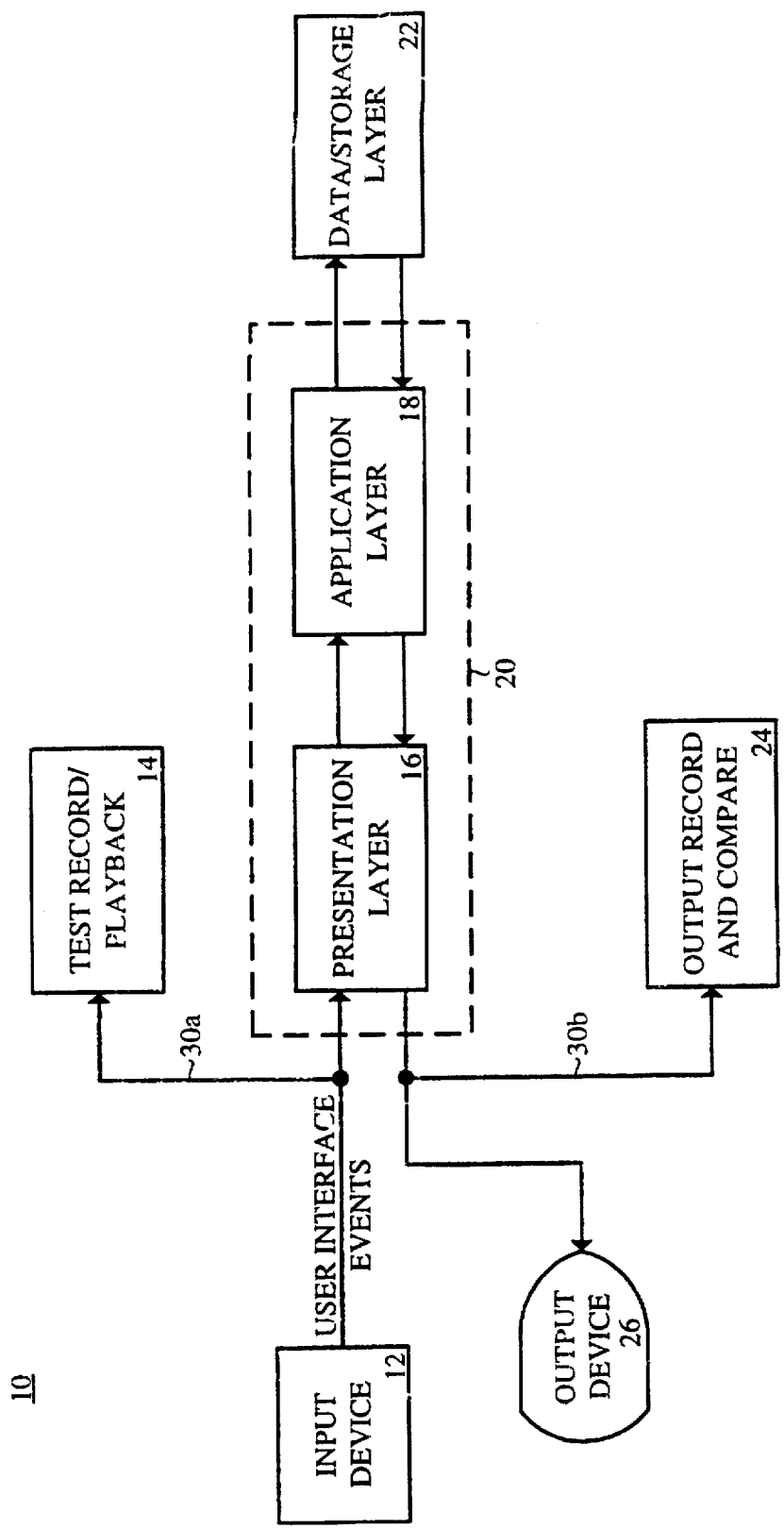
FIG. 1 illustrates a prior art testing system user interface based commands and information presented to the user are recorded for testability.
Figure 2A:
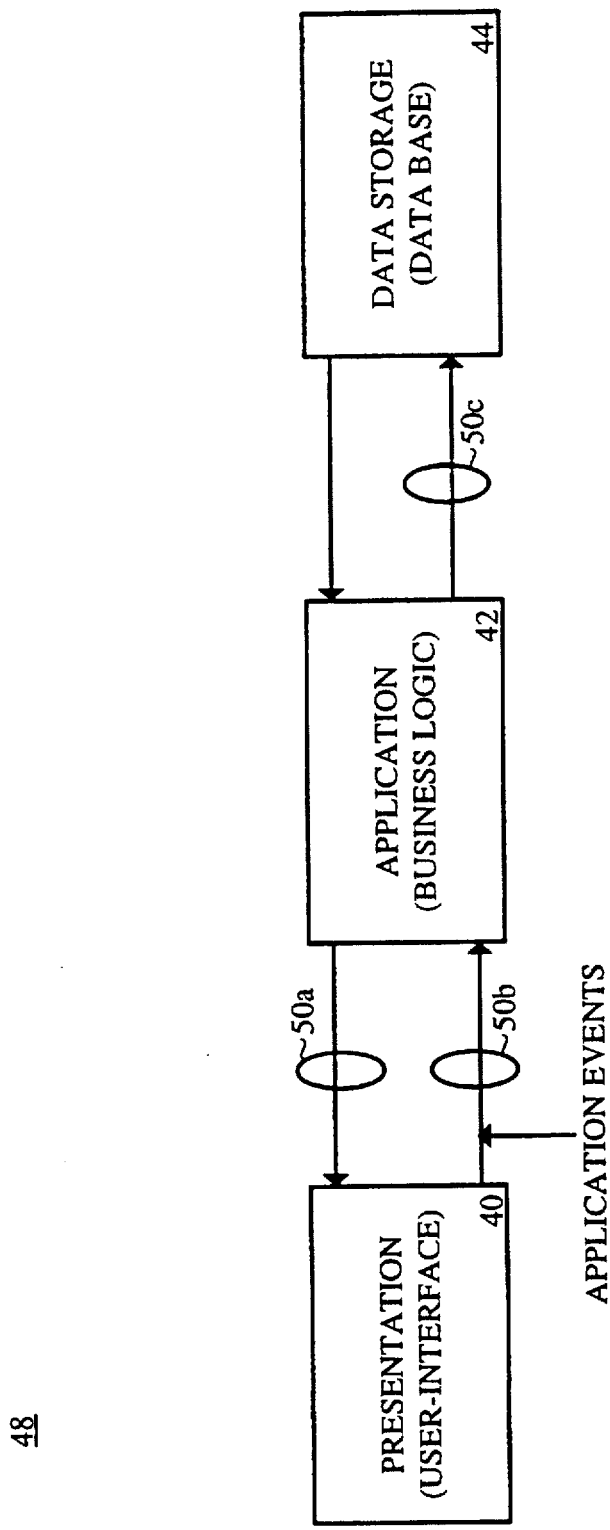

FIG. 2A illustrates an architecture of a software program ("product") 48 used within the present invention including a presentation (e.g., user interface) layer 40, an application (e.g., business logic) layer and a data storage (e.g., database information storage) layer 44. The presentation layer 40 consists of a number of user interface objects, typically of a graphical nature. For example, in an order processing software program, layer 40 contains screens for entering or querying orders in the system, displaying reports, etc. Within the scope of the present invention, a number of different presentation layers 40 can be used. The application layer 42 contains the relevant business or application logic of the software product 48. For example, application layer 42 contains field validation logic, business rules logic, searching logic, sorting logic, mathematical computation logic (e.g., arriving at price totals, discounts, tax percentages, etc.), logic for fetching (extracting) records from data storage layer 44, etc. Generally, the application layer 42 maps or links the specific data presented by the presentation layer 40 to the data storage layer 44 and in so doing realizes a particular business application (e.g., general ledger, inventory control, payroll processing, reservation handling, commercial/financial applications, etc.). The storage layer 44 contains the software for persistently storing and retrieving application data. For example, data storage layer 44 can consist of tables, indexes, pointers, etc. Within the scope of the present invention, the data storage layer 44 is not of particular importance.

User application events are transferred from the presentation layer 40 to the application layer 42 via information paths 50b. Commands from the application layer 42 are forwarded to the presentation layer 40 via paths 50a. Commands and data are communicated from application layer 42 to data storage layer 44 via paths 50c. Data retrieved from data storage layer 44 is also communicated back to application layer 42. Of particular importance within the present invention are information paths 50b. Although shown as paths or pathways, paths 50a–50c can be represented as software code segments (e.g., software calls). User interface based events (e.g., keystrokes, mouse clicks, etc.) enter the presentation layer 40 and are translated by the presentation layer 40 into higher level user application events which are communicated from presentation layer 40 to application layer 42 via paths 50b. Considering the same application layer 42, no matter which presentation layer 40 is used, the user application events transmitted over line 50b are generally the same.

During regression testing, the present invention captures the user application events transferred over paths 50b with respect to a reference program and records them for playback to the application layer 42 of a test program. The user application events are captured using software segments ("hooks") that are installed within pathways 50b. During playback, the present invention applies the recorded user application events to information pathways 50b. By decoupling testing of the application layer 42 from the presentation layer, the present invention directly tests the application layer 42 independently (e.g., without interaction) of the presentation layer 40.

Figure 2B:
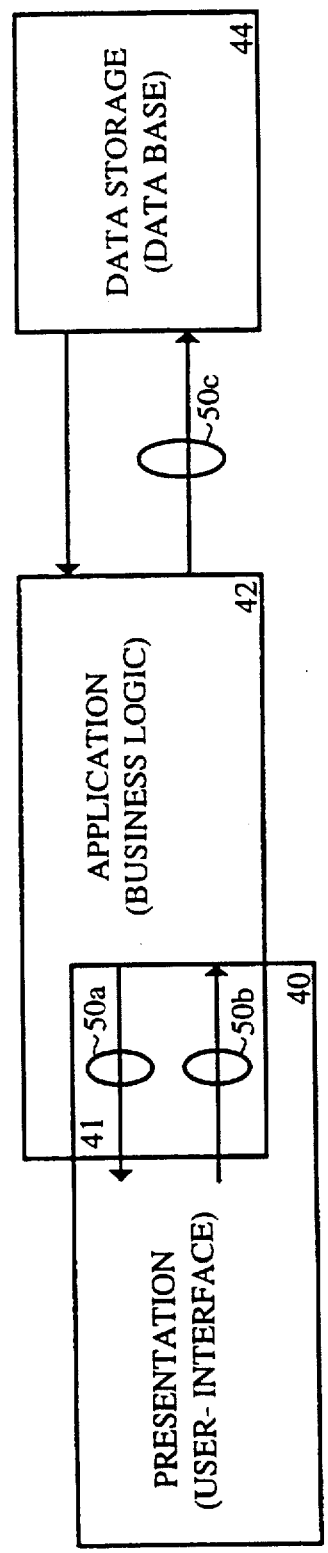
FIG. 2B illustrates a software architecture of FIG. 2A wherein overlaps exist between the presentation and application layers.

FIG. 2B illustrates that the present invention also applies to software products 48' where the dividing line between the presentation layer 40 and the application layer 42 is not well defined or is not pre-defined by the software architecture. As shown in FIG. 2B, software overlaps exist between layers 40 and 42 within the product 48'. In this case, some of the application logic 42 can be implemented in layer 40 and vice-versa. However, there still remains identifiable code pathways 50b where user application events flow from layer 40 to layer 42. In these cases, the pathways 50b can require manual identification and isolation. In relation to the product of FIG. 2B, the present invention records user application events detected over pathways 50b of a reference program for subsequent playback to the application layer 42 of a test program, in an analogous manner as with the software product 48 of FIG. 2A.

USER APPLICATION EVENT DATA FLOW FOR TEST RECORDATION (TEST CREATION) AND TEST PLAYBACK

Figure 3:
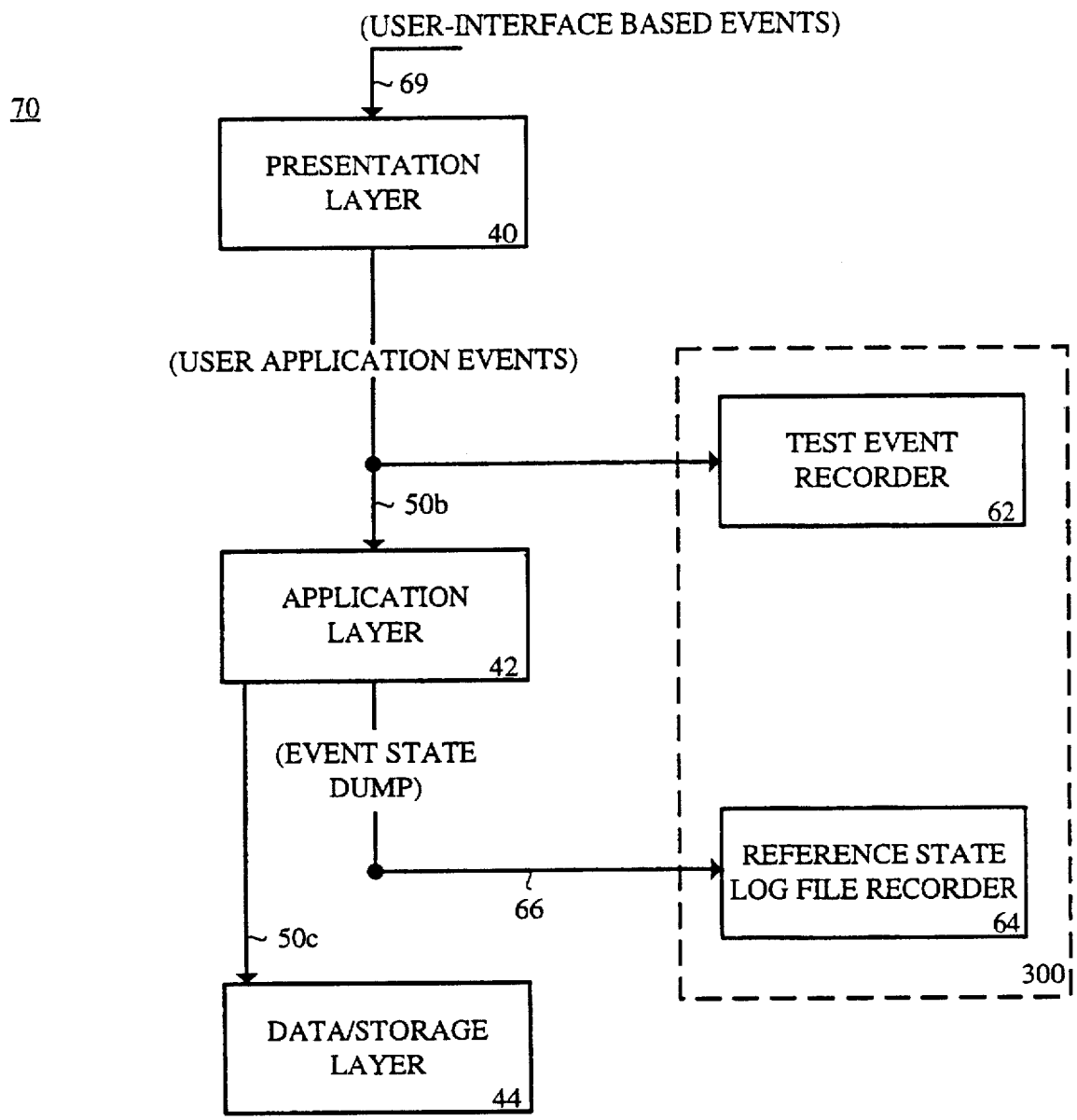
FIG. 3 is a data flow diagram of the test creation system of the present invention where application events are recorded by a test event recorder and a reference state log file is generated.

FIG. 3 is a diagram illustrating the data flow of the present invention regression testing system during test creation when user application events are recorded regarding a reference program (software product). During test creation, a corresponding reference state log file is also generated. User interface based commands 69 (e.g., keystrokes, mouse clicks, etc.) enter the presentation layer 40 during test creation. At this time, the software product 48, 48' operates in its normal manner. User or logical application events ("application events") are transferred over pathway 50b and are recovered via software hooks and relayed to a test event recorder 62 where they are stored in a test playback event file. The user application events are also communicated to the application layer 42 for processing. Upon each application event entering the application layer 42, the present invention determines the difference in the state of the software product (e.g., the state of the data within the application layer 42 and data storage layer 44) caused by the application events. This difference is detected and stored using a reference state logic file recorder 64 that is coupled to application layer 42. At the completion of the test creation, a reference state log file and a test playback event file are generated. Database information is communicated to and from the data storage layer 44. The recorders 62 and 64 are implemented by process 300, described further below.

Figure 4:
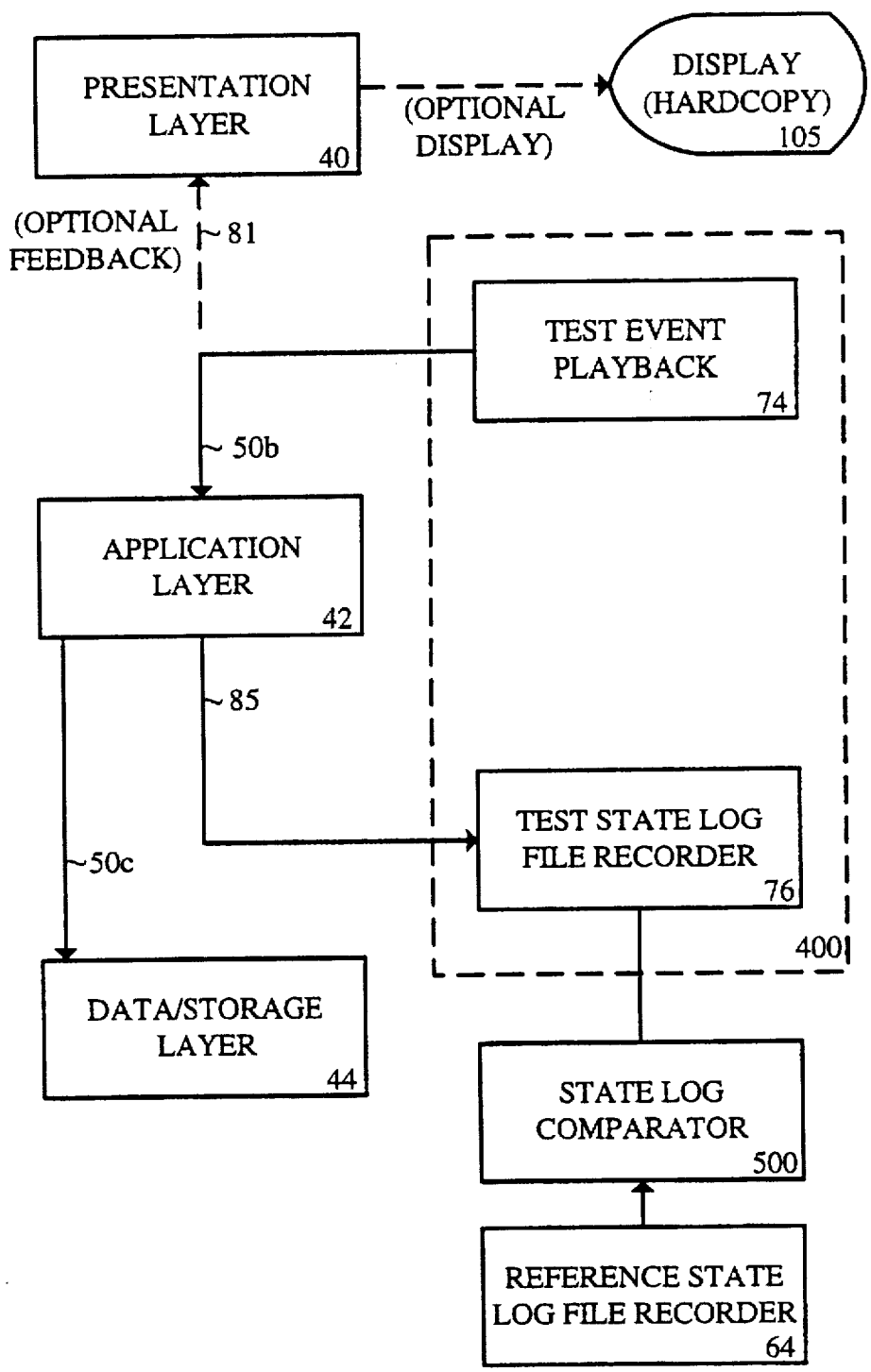
FIG. 4 is a data flow diagram of the test playback system of the present invention where recorded application events are played back and applied to the application layer and a test state log file is generated.

FIG. 4 illustrates the data flow of the present invention regression testing system during test playback of recorded user application events. During test playback of a created test, recorded application events are output from test event playback recorder 74 and applied to pathways 50b. The application events are directly applied to the application layer 42 of the test software program (software product) during playback with no required interaction with the presentation layer 40. At this time, the software product 48, 48' operates in its normal manner. Upon each recorded application event entering the application layer 42, the present invention determines the difference in the state of the software product 48, 48' in response to the application event. This difference is detected and stored using a test state log file recorder 76 which generates a test state log file. Recorders 74 and 76 are implemented by process 400, described further below. It is appreciated that the reference state log file recorder 64 and the test state log file recorder 76 supply information to state log comparator process 500 at the completion of a test playback. Comparator process 500, described further below, compares the reference and test state log files for mismatches.

Optionally, the recorded application events can be applied to the presentation layer 40 (via path 81) and translated into display codes so that a user can visualize the progress of the test playback on a display unit 105.

HARDWARE PLATFORMS

Figure 5A:
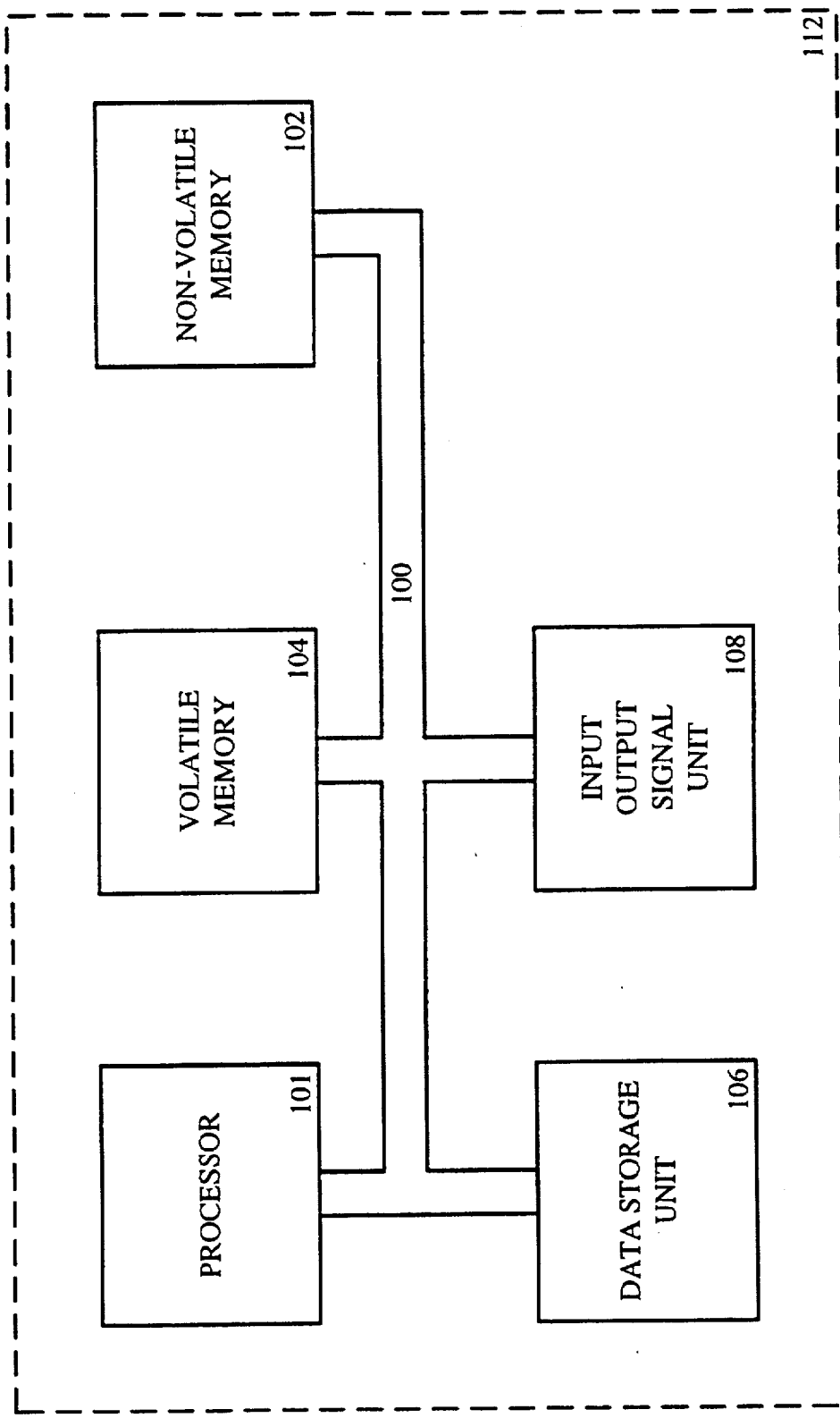
FIG. 5A illustrates an exemplary computer processor system in accordance with the present invention.

In advance of discussing the steps of the procedures of the present invention regression testing system, exemplary hardware platforms are described on which these procedures operate. FIG. 5A illustrates an exemplary computer processor system 112 including a processor (e.g., a microprocessor) 101 coupled to an address/data bus 100. A computer readable volatile memory unit (e.g., RAM unit) 104 and a computer readable non-volatile memory unit (e.g., ROM, EPROM, EEPROM, PROM, flash memory, programmed antifuses, etc.) 102 are both coupled to bus 100. Also coupled to bus 100 are an optional input/output signal communication unit 108 and another computer readable memory unit, a high capacity data storage unit (e.g., magnetic and/or optical disk drive) 106. Communication unit 108 allows bus 100 to communicate externally with other devices. Procedures of the present invention regression testing system, described below, are implemented as program code stored within the above referenced computer readable memories and executed by processor 101. In some embodiments, the above referenced procedures are stored as program code in portable computer readable storage devices such as floppy diskettes, CD ROM medium, memory cards, etc. The above procedures from the portable storage devices are loaded into the system 112 to be executed by the processor 101.

Figure 5B:
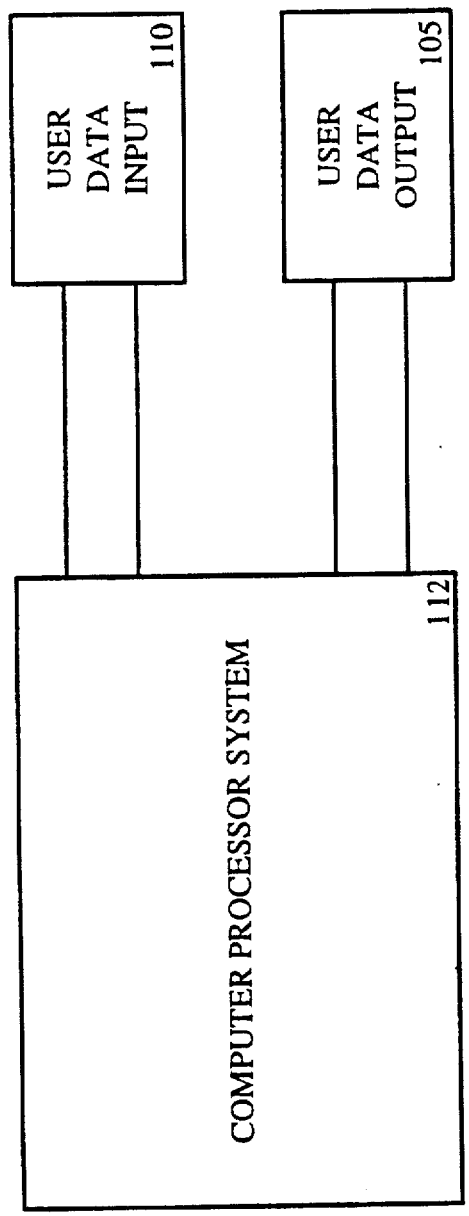
FIG. 5B illustrates an exemplary user interface computer system in accordance with the present invention.

FIG. 5B illustrates an exemplary user interface computer system 114 which is a specially adapted computer processor system for directly interfacing with a user. System 114 contains a computer processor system 112 coupled to specific user interface components. Specifically a user data input device 110 is provided (e.g., a keyboard, mouse, track pad, stylus and pad, trackball, etc.) in conjunction with a user data output device 105 (e.g., a display screen, printer, speaker, etc.) for rendering information to a user. The display device 105 can be a liquid crystal device, cathode ray tube, or other display device suitable for creating graphic images and alphanumeric characters recognizable to the user.

Figure 6A:
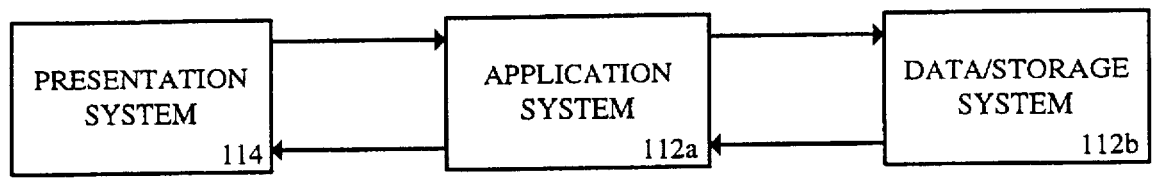
FIG. 6A illustrates a first exemplary embodiment of the present invention wherein the application, presentation, and data/storage layers are implemented on separate computer systems.

Within the present invention, the software architecture of product 48 (FIG. 2A) can be implemented in hardware using a number of different configurations using system 112 and system 114. Some exemplary configurations are shown below. FIG. 6A illustrates a configuration wherein each layer (e.g., presentation 40, application 42, and data storage 44) of product 48 is implemented using a different computer system. Each system (114, 112a, and 112b) is joined by a communication path or network. An application system 112a implements the application layer 42 using system 1 12 and a data storage system 112b implements the data storage layer 44 using system 112. Lastly, the presentation layer 40 is implemented using presentation system 114. The application layer 42 and the data storage layer 44 typically do not require user interface elements, but can be implemented using system 114 in lieu of system 112.

Figure 6B:
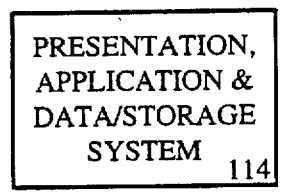
FIG. 6B illustrates a second exemplary embodiment of the present invention wherein the application, presentation, and data/storage layers are implemented on a single computer system.
Figure 6C:
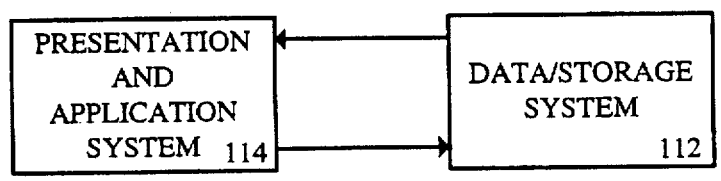
FIG. 6C illustrates a third exemplary embodiment of the present invention wherein the presentation and application layers are implemented in a single computer system and the data/storage layer is implemented on a separate computer system.

FIG. 6B illustrates an alternative embodiment of the present invention where the presentation layer 40, application layer 42, and data storage layer 44 are implemented within a single computer system 1 14. FIG. 6C illustrates an alternative embodiment of the present invention commonly referred to as the "fat client" implementation with respect to a client-server environment. In this embodiment, the presentation layer 40 and the application layer 42 are both implemented in a single computer system 114 which is coupled to system 112 which implements the data storage layer 44 (e.g., the server).

Figure 6D:
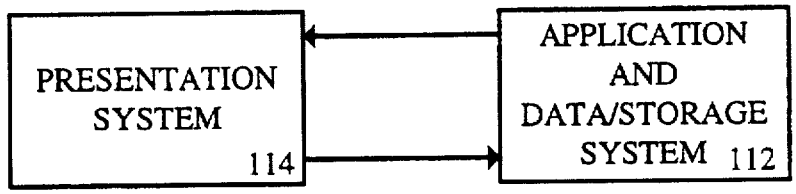
FIG. 6D illustrates a fourth exemplary embodiment of the present invention wherein the application and data/storage layers are implemented in a single computer system and the presentation layer is implemented on a separate computer system.

FIG. 6D illustrates another embodiment where the application layer 42 and the data storage layer 44 are both implemented in system 112. System 112 is then coupled to a separate computer system 114 which contains the presentation layer 40. The configuration of FIG. 6D is common in applications where the presentation system 114 (the client) is separate from system 112 and couples to system 112 using a communication network, e.g., the internet application running hypertext transfer protocol. In this case, the graphical user interface of the presentation layer 40 can be different for each user that logs into system 112, however, the application layer 42 is the same for all users.

The present invention regression testing system is particularly useful in such environment of FIG. 6D because not only is the presentation layer 40 different for each user, but in some cases may be unknown to the application layer 42 or unknown to developers at the time the application layer 42 is tested.

IDENTIFICATION AND ISOLATION OF RELEVANT COMMUNICATION PATHWAYS

Some software products have architectures that clearly distinguish the separation between the presentation layer 40 and application layer 42 (FIG. 2A). With these products, the pathways 50a and 50b are typically predefined and are input to the present invention as a defined communication bridge. In other situations (FIG. 2B) overlaps exist. Procedure 200 comprises preliminary steps of the regression testing system of the present invention for defining the pathways 50b from the presentation layer 40 to the application layer 42 and defining the user. (logical) application events transmitted over pathway 50b.

Figure 7:
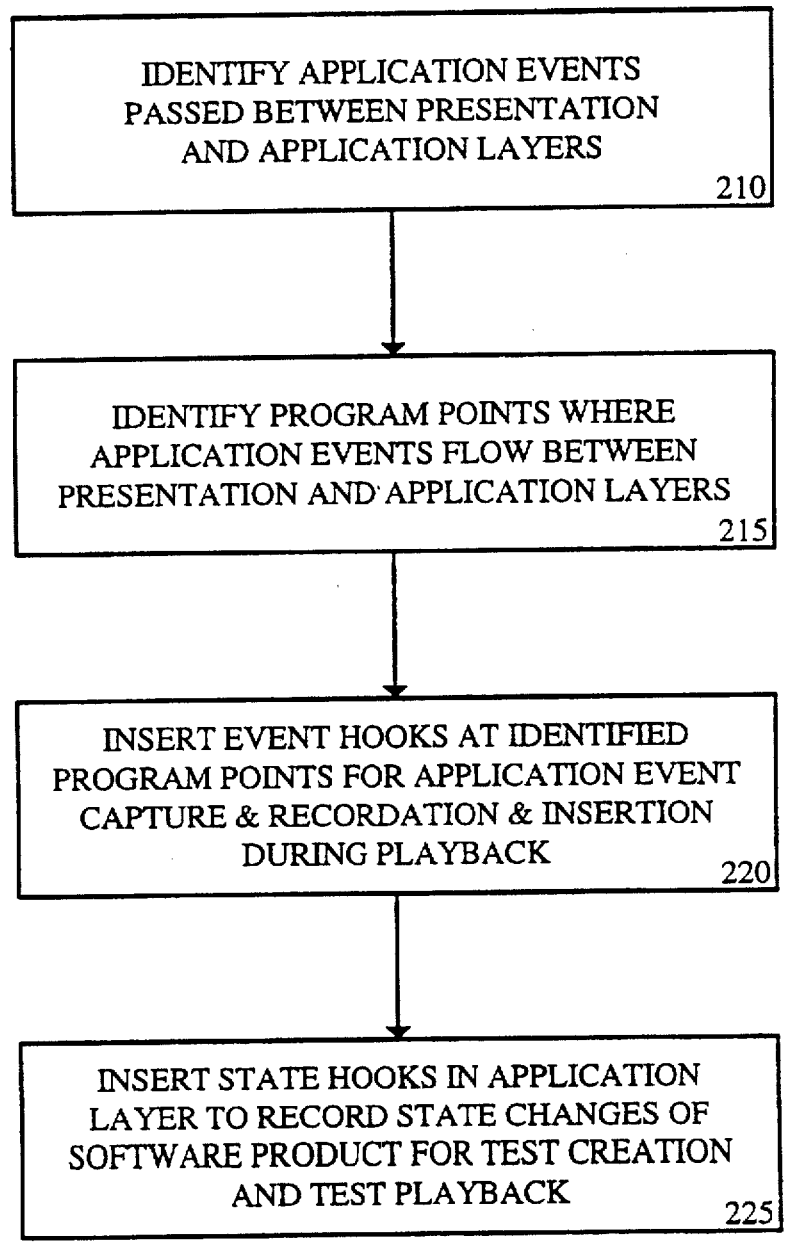
FIG. 7 illustrates steps of the present invention for identifying and isolating communication pathways between presentation and application layers.

Process 200 of FIG. 7 commences at step 210 wherein the logical events passed between the presentation layer 40 and the application layer 42 are identified and defined. Step 210 can be either manual or automatic by sampling the commands that are transferred over pathway 50b between the layers. A manual identification within step 210 is accomplished by abstracting the user interface events to an abstraction level where only their effect on the application layer 42 is recording as an application event. It is often the case that the presentation layer 40 and the application layer 42 are tightly coupled (FIG. 2B). In this case, certain defined application events can include a small subset of high level abstractions that are "application events" but are somewhat user interface based. These "application events" can be tolerated within systems such as those shown in FIG. 2B.

At step 215 of FIG. 7, the present invention requires that specific program points be identified and isolated to define the pathways 50b between the presentation 40 and application 42 layers. Step 215 can be performed automatically if a predefined communication bridge is provided which well defines the inputs (and their locations) to application layer 42 and their locations. Step 215 can also be performed manually by code inspection for systems as shown in FIG. 2B. At step 220, the present invention requires that program segments, e.g., "hooks," be inserted into the identified program points defined in step 215. These hooks function to report the defined application events that pass over the pathway 50b. A number of well known program techniques can be utilized at step 220 to generate and insert the program hooks.

At step 225 of FIG. 7, the present invention requires that hooks be placed at code points which report the present state of the software product after a processed application event. These hooks can be placed within the application layer 42 to report the present state of the application layer 42 (and data storage layer 44). Differences in this state, from one application event to another, are determined based on information reported from the hooks applied at step 225.

PROCESSES FOR TEST GENERATION AND PLAYBACK AND COMPARISON OF REFERENCE AND TEST STATE LOG FILES

Figure 8:
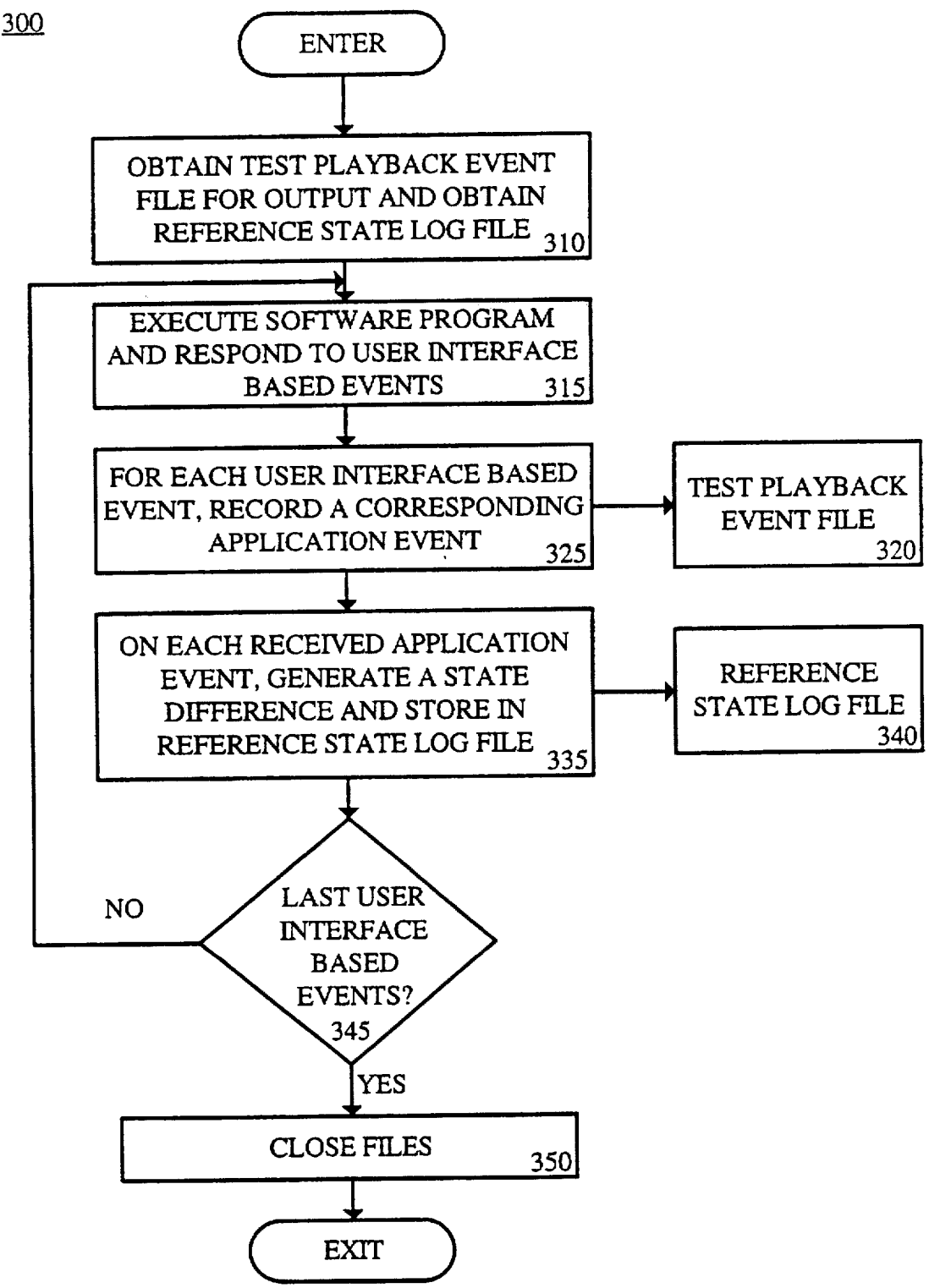
FIG. 8 illustrates steps of the process of the present invention for interactive creation of a test playback event file within the present invention.

FIG. 8 illustrates process 300 of the regression testing system of the present invention for creating a test. It is appreciated that process 300 (and its subprocesses) are implemented as program instructions executed by processor 101 and stored in a computer readable memory unit (e.g., unit 104, unit 102, unit 106). When executed, the stored instructions cause the computer system to perform the illustrated steps. At step 310, to create a test, the user specifies names for a test playback event file 320 ("playback file" 320) and for a reference state log file 340 ("reference file" 340) using command line arguments which control the test mode operation. Specifically, command line arguments including a RECORD= command identifies the name of the playback file 320 and a LOG= command specifies the reference file 340. An example syntax for step 310 is shown below:

run program_name record=test1. tfi log=test1. trf where program_name is the software product to test, test1.tfi is playback file 320 and test1.trf is the reference file 340.

At step 315, the software product 48, 48' specified by program_name operates in its normal fashion. The presentation layer 40 of program_name responds to user interface events (e.g., user keystrokes, mouse clicks, etc.) received over line 69 (FIG. 3) and the application layer 42 responds to user application events received over pathway 50b. At step 325 of FIG. 8, for a received user interface event or set of related events, a corresponding application event is recorded into the test playback event file 320, which is initially cleared before process 300 commences. At step 325, the inserted hooks of pathway 50b detect the presence of application events and report these events so that the application events are recorded into playback file 320.

Figure 9:
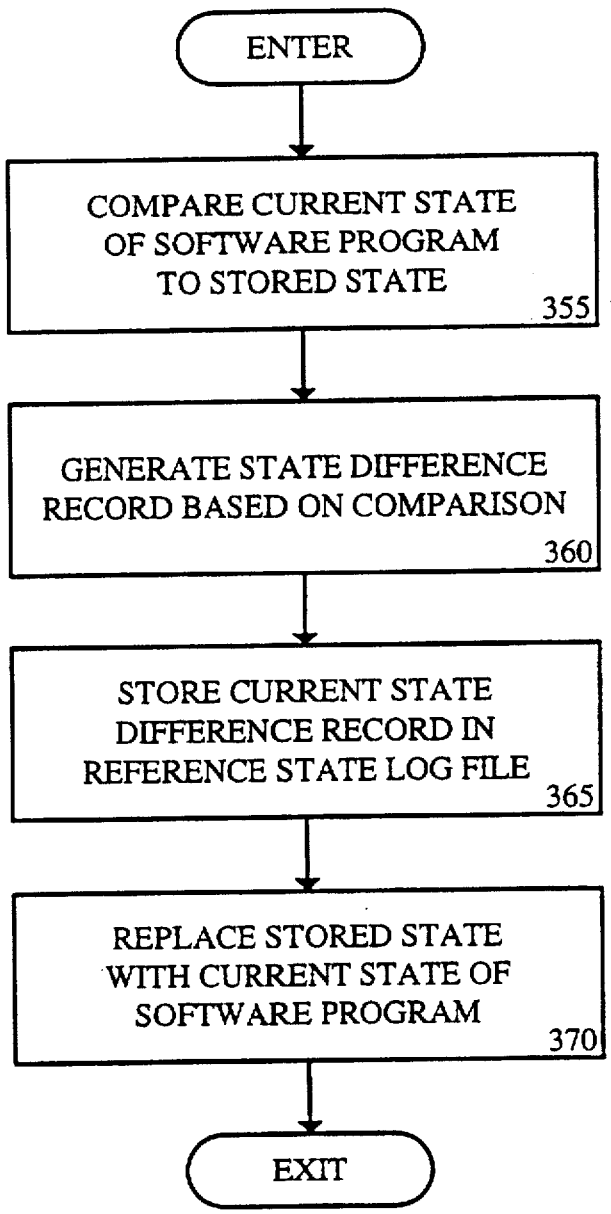
FIG. 9 is a flow chart of the process of the present invention for detecting and recording differences in the state of a reference software program between application events to generate a reference state log file.

At step 335, the responses of the software product 48, 48' (program_name) to the application events received at step 325 are recorded. On each application event received from pathway 50b and applied to the application layer 42, the present invention generates a state difference record. This record represents the difference in the state of the software product 48, 48' as represented by the application layer 42 and the data storage layer 44, caused by the application event. At step 335, this state difference record is stored within a reference state log file 340. The difference in the state of the software product 48, 48' is stored rather than its complete state in order to reduce the volume of information stored in the reference file 340. The steps of process 335 are shown in FIG. 9. It is appreciated that the state difference records are quantized precisely to the application event inputs so that small variances in the timing and order of application state changes do not cause false comparison failures during test playback.

By automatically recording the differences in the entire state of the software product 48, 48', the present invention does not require the user to determine the specific information that should be recorded for testability. This frees the user from performing the labor intensive task of defining screen capture areas for data storage and also avoids the problem of missing errors due to user defined capture information that is insufficient in scope.

At step 345 of FIG. 8, the present invention determines if the received application event is the last event of the program (program_name), e.g., step 345 checks if the program completed. If not, processing returns to step 315 to process the next application event. If the program completed, then optional step 350 is entered and the test playback event file 320 and the reference state log file 340 are closed. Process 300 then exits.

FIG. 9 illustrates the subprocesses of step 335 of FIG. 8. At step 355, the present invention compares the entire current internal state of the software product 48, 48' under test (as represented by the application layer 42 and the data stored within data storage layer 44) to a stored entire internal state based on the previous application event. A number of well known procedures to determine the entire internal state of a software product 48, 48' can be used within the scope of the present invention. At step 360, the present invention generates a highly structured state difference record based on the comparison of step 355. The format of the state difference record tightly mimics the format in which data is stored and used internally within the software product (e.g., within the application layer 42 and the data storage layer 44). Therefore, the state difference record is readily searchable by sophisticated searching and comparison procedures. An exemplary format of the state difference record is described with respect to Table II. At step 365 of the present invention, the state difference record determined in step 360 is stored in the reference state log file 340. At step 370, the present invention replaces the stored state of application layer 42 with the current state of application layer 42. It is appreciated that upon the first pass through procedure 335, header information is recorded into the reference state log file 340, such as the current version of the software program and the test date and test time (optionally).

Figure 10:
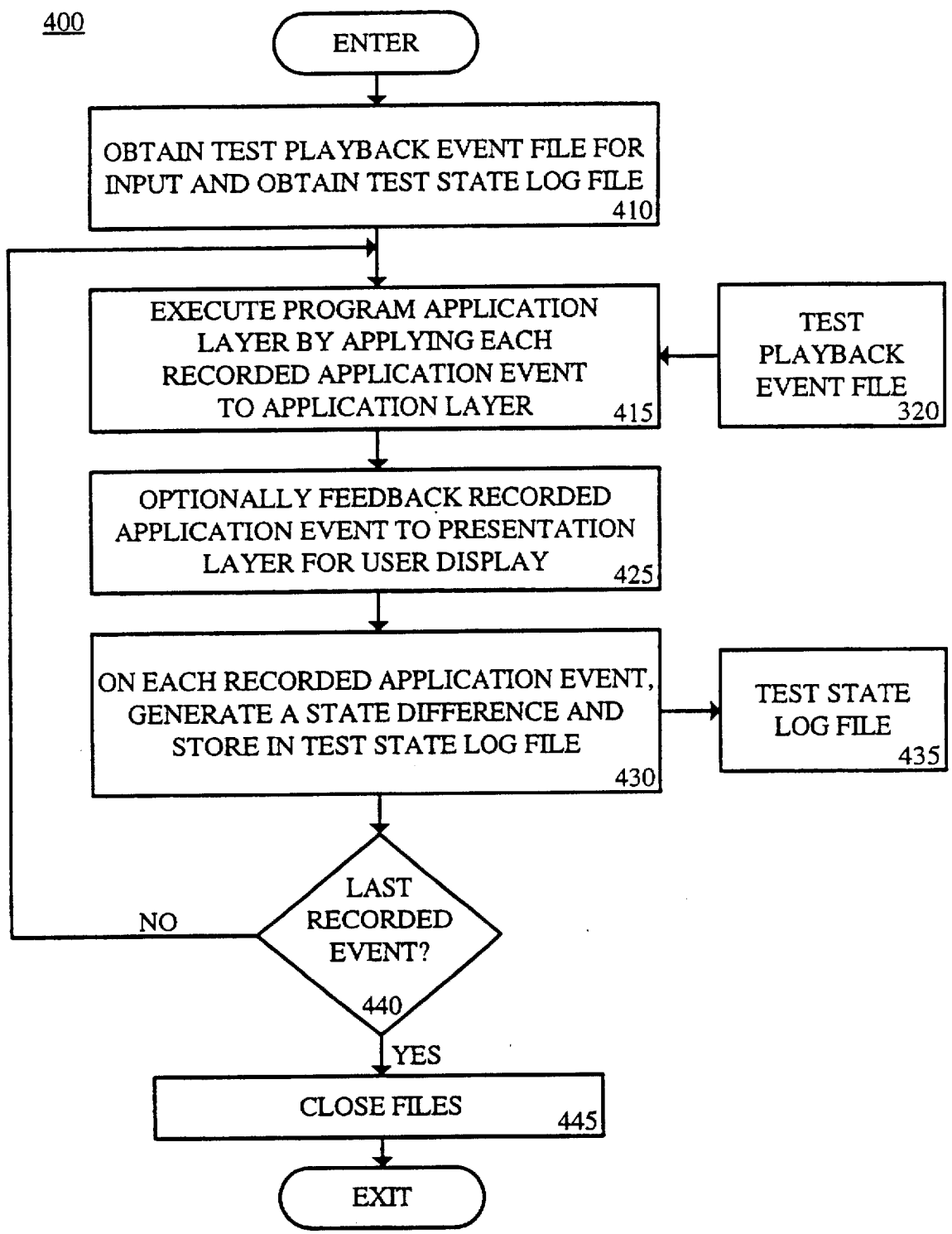
FIG. 10 illustrates steps of the process of the present invention for automatic playback of a recorded test playback event file within the present invention for regression testing of a test software program.

FIG. 10 illustrates process 400 of the regression testing system of the present invention for playback of a recorded test playback event file 320 with respect to a software program. It is appreciated that process 400 is implemented as program instructions executed by processor 101 and stored in a computer readable memory unit (e.g., unit 104, unit 102, unit 106). When executed, the stored instructions cause the computer system to perform the illustrated steps. To play a test, the user specifies the playback event file 320 and a test state log file 435 at step 410. Specifically, command line arguments including a PLAY= command identifies the name of the playback file 320 and a LOG= command specifies the test state log file (test file) 435. An example syntax for step 410 is shown below:

run program_name play=test1. tfi log=test1. tfp
where program_name is the software product 48, 48' to test, test1.tfi is playback file 320 and test1.tfp is the test file 435. It is appreciated that the presentation layer 40 does not interact with the required steps of process 400.

As used herein with respect to process 400, for convenience the term "software product" refers to a modified or amended or new version of the reference software product used to generate the reference state log file 340 of process 300. The regression test is required due to the nature of the amendment or change.

At step 415, recorded application events are accessed sequentially from the playback file 320 and directly applied to the application layer 42 via pathways 50b using the installed hooks at these locations. This can be accomplished using software calls with the installed hooks. The software product 48, 48', program_name, is executed and its application layer 42 responds as if the recorded application events originated from a user entering user interface events to the presentation layer 40. At step 415, if a recorded application event causes the program to generate an error, process 400 exits. If a BREAKPOINT application event is encountered at 415, process 400 exits.

At optional step 425, the accessed application events can be fed back to the presentation layer 40 which translates them into objects that are displayed on display 105. Optional step 425 allows a user to monitor the progress of the test playback of process 400, but is not required.

Figure 11:
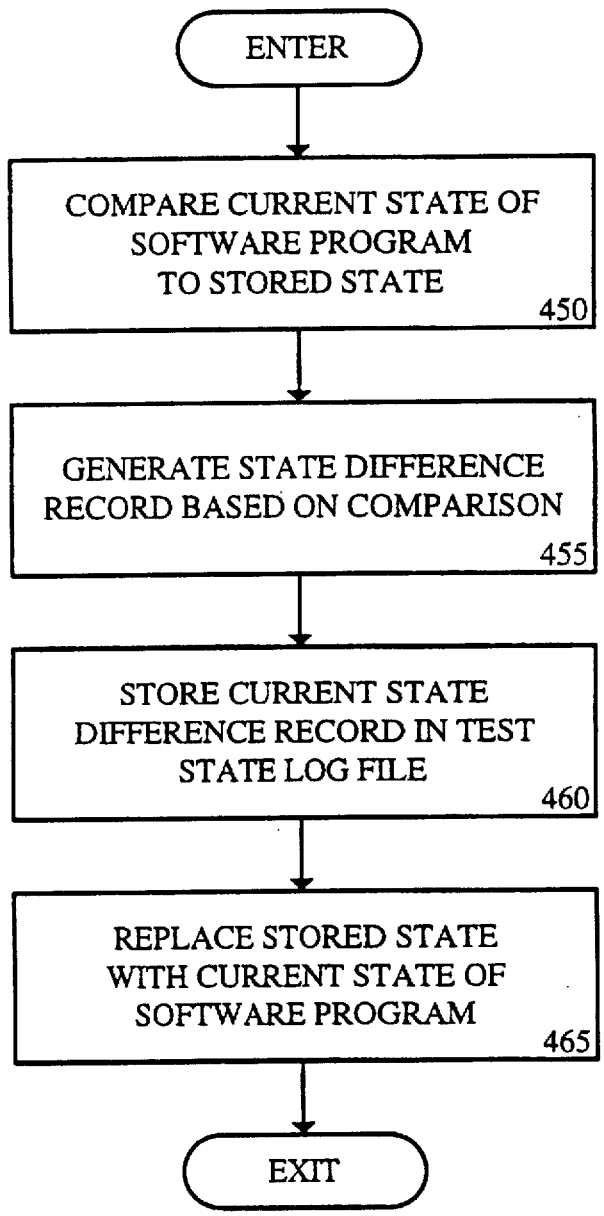
FIG. 11 is a flow chart of the process of the present invention for detecting and recording differences in the state of the test software program between application events to generate a test state log file.

At step 430 of FIG. 10, on application of each recorded application event to the application layer 42, the present invention generates a state difference record indicating the different in state of the software program 48, 48' caused by the application event. The state difference record is stored within the test state log file 435. The steps of process 430 are shown in FIG. 11. At step 440, the present invention determines if the current application event is the last application event within the test playback event file 320. If so, step 445 is executed where files 320 and 435 are closed. At step 445, if the end of the test playback file 320 is reached but the software program was not completed, an end of file (EOF) error is generated. If the current event is not the last event in file 320, processing returns to step 415 to process the next recorded application event.

FIG. 11 illustrates the steps of subprocess 430 of FIG. 10. These steps are analogous to the step of subprocess 335 of FIG. 9 except that in FIG. 11 the test state log file 435 is constructed in lieu of the reference state log file 340 and state differences of the test software program are measured, not the reference software program.

Figure 12:
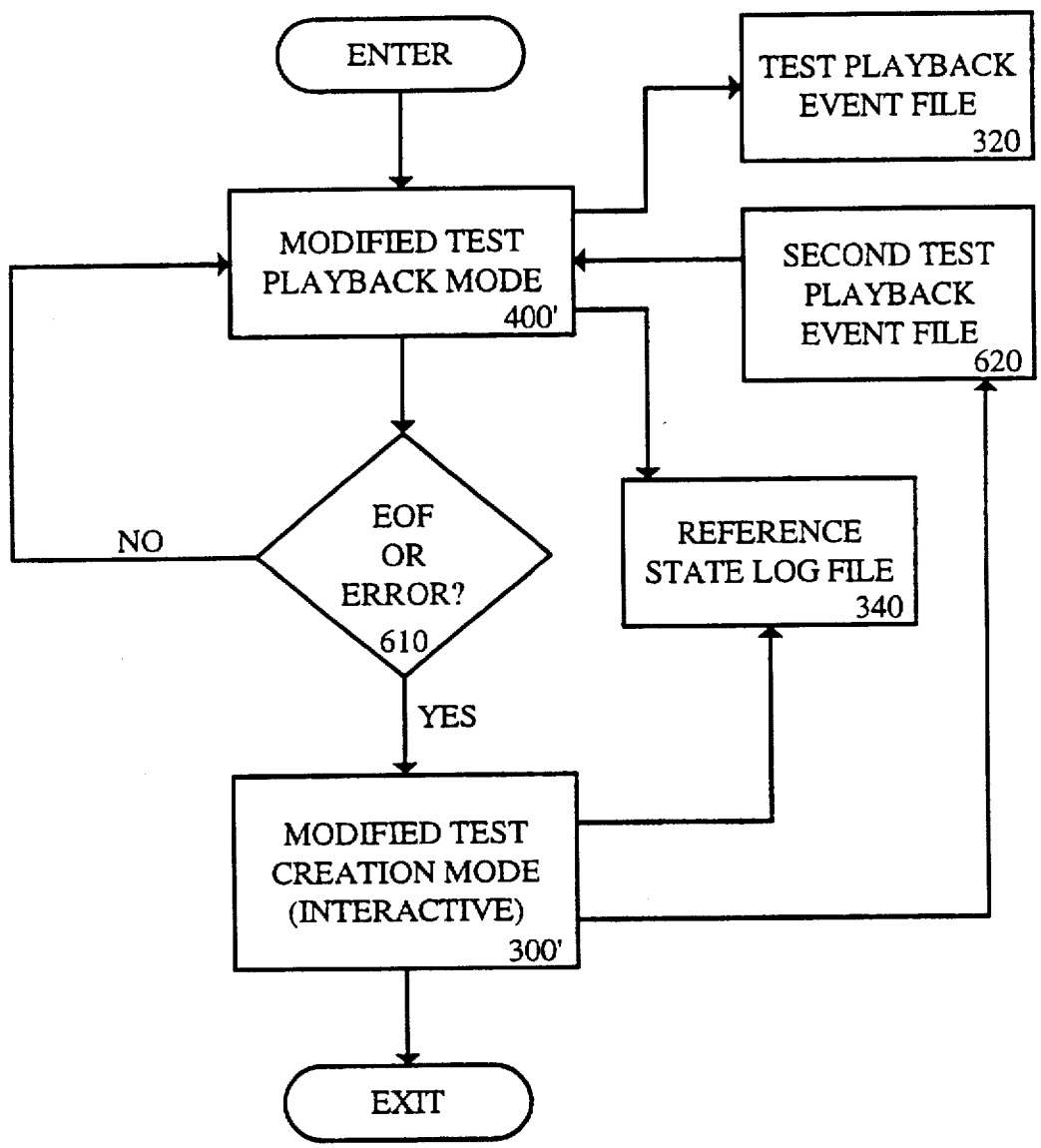
FIG. 12 is a flow chart of a process of the present invention for transitioning between automatic test playback mode and interactive test creation mode.

FIG. 12 illustrates a process 600 of the present invention used to interactively edit a test. Process 600 is implemented as program instructions executed by processor 101 to cause a computer system to perform the illustrated steps. The program instructions are stored in a computer readable memory unit (e.g., unit 104, unit 102, unit 106). To interactively edit a test, the user specifies a playback event file 320, a second playback event file 620, and a test state log file 435 at step 410. Specifically, command line arguments including a PLAY= command identifies the name of file 320, a RECORD= command identifies file 620, and a LOG= command specifies file 435. An example syntax is shown below:

run program_name
play=test1.tfi record=2ndtest .tfi log=test1.tfp where program_name is the software product 48, 48' to test, test1.tfi is playback file 320, 2ndtest1.tfi is the second playback file 620, and test1.tfp is the test file 435. Process 400' is a modified version of the test playback mode 400. During process 400', events from the playback event file 320 are replayed and also recorded into the second playback event file 620. If no errors occur during playback 400', processing from step 610 does not interrupt process 400' and file 320 remains equivalent to file 620. At step 610, a detected program error or EOF from process 400' causes process 600 to enter process 300'. At process 300', the interactive mode is entered and received user interface events are translated into application events by the presentation layer 40. Application events are then recorded into the second test playback event file 620. Process 600 allows developers to fix broken tests interactively without having to recreate the entire test, and allows developers to create new tests by adding on to an existing test.

In processes 400' and 300', state difference records are recorded into reference state log file 340 whether application events are being recorded or replayed. If the RECORD= or PLAY= command appears without the LOG= command, then no state log file 340 is created.

Table I illustrates different modes available within the present invention processes 300, 400, and 600 based on different input command line arguments.

TABLE I

| REC | PLAY | LOG | Regression System Effect | PLAYBACK ERROR |
|---|---|---|---|---|
| — | — | — | Normal program operation | |
| xxxx | — | — | Record test | |
| xxxx | — | xxxx | Record test, write state log | |
| — | xxxx | — | Play test for diagnosis | Interactive |
| — | xxxx | xxxx | Play test, write state Log | Exit |
| xxxx | xxxx | — | Play test, record new test | Interactive |
| xxxx | xxxx | xxxx | Play test, record test, write log | Interactive | xxxx = specified as command line argument
— = not specified as command line augment Encountered Playback Error. It is appreciated that a number of different software product errors (e.g., data validation errors, LOV mismatches, etc.) can cause process 400 of FIG. 10 to terminate without completion of the test playback event file 320. For instance, there can be an alert presented to the user, but the next action in the test playback event file 320 is not an alert action. A number of these possible errors are described in the application events definition section below. The present invention deals with these conditions in a manner dependent on the setting of the other command line arguments.

For instance, if the PLAY=, RECORD= and LOG= commands are defined, the operator is presumed to be running the test manually, and it is assumed that he or she desires to make changes to the current test playback event file 320. On the error, the present invention switches to interactive mode (300' FIG. 12), and recording continues. If a state log file is being written, it remains open, only now events are written to it upon every write to the Record= file, instead of being written upon every read from the Play= file. The user will be advised of the error/EOF condition with a message in the log file.

If the PLAY= and LOG= commands are defined, present invention is presumed to be operating in process 400. In this case, an error/EOF results in a termination of process 400 since there is typically no operator standing by to interact with the process, and a batch operation is typically awaiting the termination of this test. If only the PLAY= command is defined, the operator is presumed to be running the test in a diagnostic mode. In this case, an error/EOF condition halts the execution of the test playback event file 320, and leaves the software product 48, 48' in a mode where user input can be accepted. The user is advised of the error/EOF condition with a message. Generally, when a BREAKPOINT command is read from the test playback event file 320, the test operation is halted as if an error/EOF condition had occurred.

Figure 13:
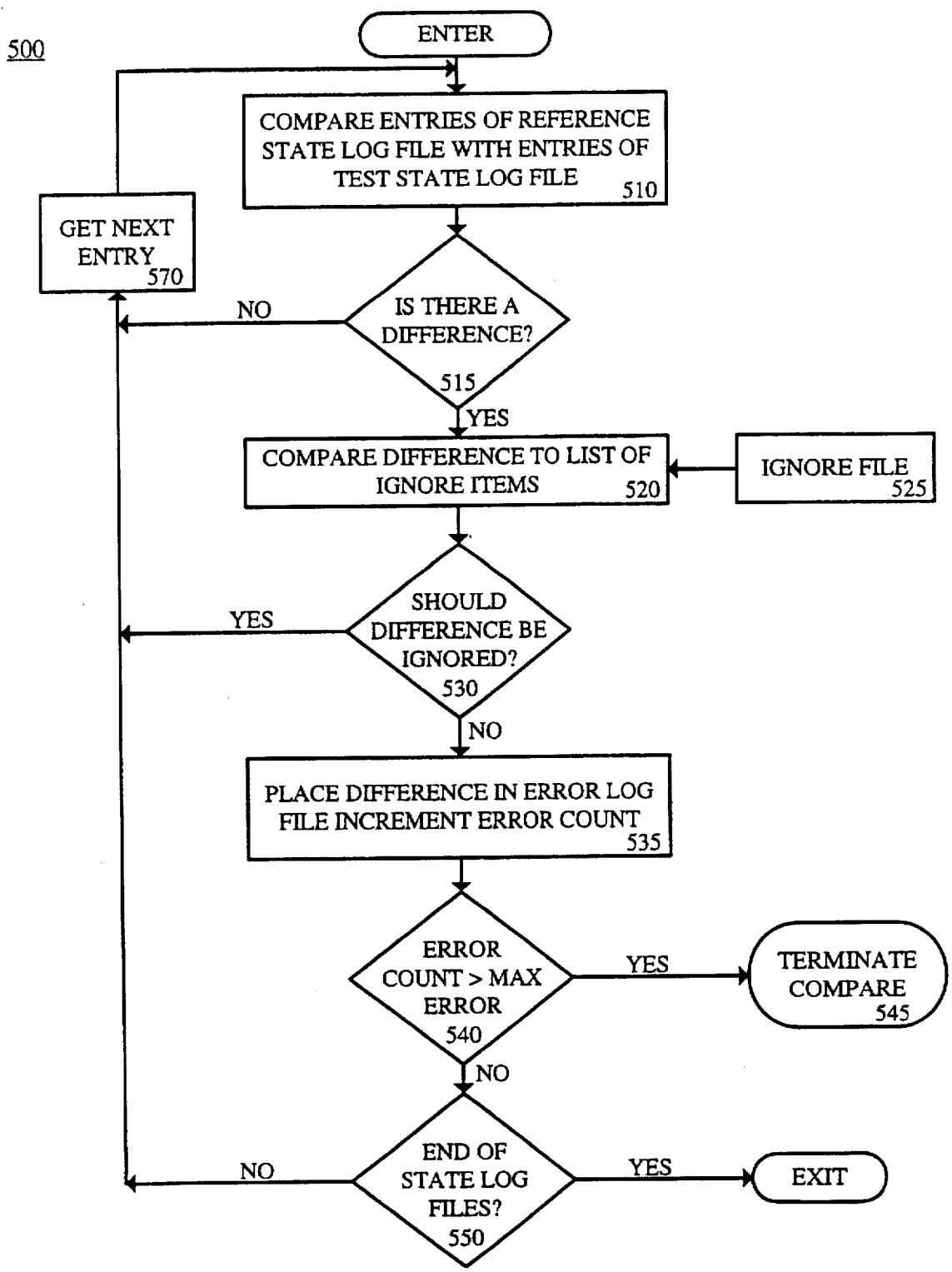
FIG. 13 illustrates steps of the process of the present invention for detecting and reporting differences between the reference and test state log files.

State Log Comparison. FIG. 13 illustrates process 500 of the present invention regression testing system for comparing a reference state log file 340 and a test state log file 320. It is appreciated that a number of comparison processes can be used within different embodiments of the present invention. Exemplary process 500 includes special procedures for ignoring certain user supplied sequences whose state log mismatches are deemed irrelevant. Process 500 is implemented as program instructions executed by processor 101 to cause a computer system to perform the illustrated steps. The program instructions are stored in a computer readable memory unit (e.g., unit 104, unit 102, 10). Process 500 can be executed by a command line syntax as shown below:

compare ref_log=test1 . tfr, test_log=test1 . tfp,
    ignore_file=test1 . tfc, sum_file=test1 . tfo At step 510, the present invention compares the entries of the reference state log file 340 (defined by ref_log=) with the entries of the test state log file 320 (defined by test_log=) on an entry by entry basis. Each entry comprises a state difference record generated in FIG. 9 and FIG. 11. At step 510, for each application event, two corresponding state difference records exist, one in reference state log file 340 and one in test state log file 435. Therefore, the state difference records of the same application event are compared at step 510.

At step 515, if a difference (e.g., mismatch) is detected in two corresponding state difference records from the reference and test state log file, processing flows to step 520 and the difference information (e.g., text) is recorded. Otherwise, step 570 is entered which accesses a next entry and processing returns to step 510.

At step 520 of FIG. 13, the present invention compares the difference information against a set of user-defined sequences and commands stored in an ignore file 525 (defined by ignore_file=). At step 520, specific information stored within a header of the state log files 340, 435 (e.g., version information and test date (time) information) is also used along with ignore file 525 to ignore irrelevant mismatches. Also at step 520, before any comparison is performed, special translations of the state log files 340, 435 are performed as defined within the ignore file 525. At step 530, the present invention determines (1) if the difference information matches one of the sequences stored in the ignore file 525 or (2) comes within the scope of one of the commands in the ignore file 525. If one of the above is met, step 530 concludes that current mismatch should be ignored as irrelevant and processing continues to block 570. If no match is located at step 530, the present invention enters step 535.

At step 535 of FIG. 13, the difference information is stored within a difference or summary log file (defined by sum_file=). Optionally, a difference count is incremented. At step 540, an optional check is made to determine if the current count of the different count exceeds a predetermined maximum error count value. If not, processing flows to step 550. If the difference count exceeds the maximum error count value, process 500 terminates abnormally via 545 and an error message is generated. At step 550, the present invention determines if the current entry of the state log files is the last entry. If so, process 500 exists with a termination message. Otherwise, step 570 is entered to process a next entry.

At the completion of process 500, the summary log file is readable to determine the extent to which the test software program used in step 400 passed or failed the regression test with respect to the reference software program used in step 300.

USER APPLICATION EVENTS AND THE TEST PLAYBACK EVENT FILE

Although the test playback event file (playback file) 320 can be implemented in a number of different well known file formats, in one embodiment of the present invention, the playback file 320 is implemented in standard ASCII text file format allowing it to be portable, readable and editable. Application events detected and relayed at step 325 (FIG. 8) are stored as commands with associated arguments in the playback file 320. One exemplary format is shown below:

COMMAND argument1, argument2, etc. Optionally, the present invention can insert comment lines associated with each recorded application event. The comment lines are placed in advance of the associated recorded application event and indicate (1) the sequence number of the application event and (2) the context (e.g., in one embodiment the context is the current focus of the user input). An exemplary playback file 320 format is shown below:

Comment: seq# 1—FORM1:BLOCK1.FIELD1 WINDOW FORM1 WINDOW1 ACTIVATE

Comment: seq# 2—FORM1 :BLOCK1.FIELD1 MENU CUSTOM SIMPLE_HELP ABOUT_COMPANYNAME_APPLICATIONS Comment: seq# 3—FORM1 :BLOCK1.FIELD1 USER_ EXIT WINDOW "About Company Applications" START Comment: seq# 4—FORM1 :BLOCK1 .FIELD1 USER_ EXIT CLICK OK Comment: seq# 5—FORM1 :BLOCK1 .FIELD1 USER_ EXIT WINDOW "About CompanyName Applications" END Comment: seq# 6 —FORM1 :BLOCK1 .FIELD1 KEY Next_block Comment: seq# 7—FORM1 :BLOCK2.QUOTE VALUE FORM1 BLOCK2 QUOTE 1 "\tNow is the time for all good men to \ come to the aid of their party"

Comment: seq# 8—FORM1 :BLOCK2.QUOTE CLICK FORM1 BLOCK1 EXIT_BUTTON 1

Comment: seq# 9—FORM1:BLOCK2.QUOTE ALERT Yes

Exemplary Application Events. Although the present invention regression testing system is operable with various application events, an exemplary set of application events related to a database processing system software product 48, 48' is presented below. Many of the application events presented below are abstracted to such a level that they are well suited for application to many software products apart from the database processing area. Generally, application events of the present invention are abstracted to such a level that they are independent of the presentation layer 40. With respect to the exemplary application event set presented below, some of the exemplary application events are duplicative and therefore, not all of the exemplary events are required within the present invention. It is appreciated that for each exemplary event presented below, the bracketed application command, e.g., [EVENT <argument1><argument2>], represents the syntax recorded into the playback file 320 for that application event. [MENU <menuname><menupath . . . >]

Figure 14A:
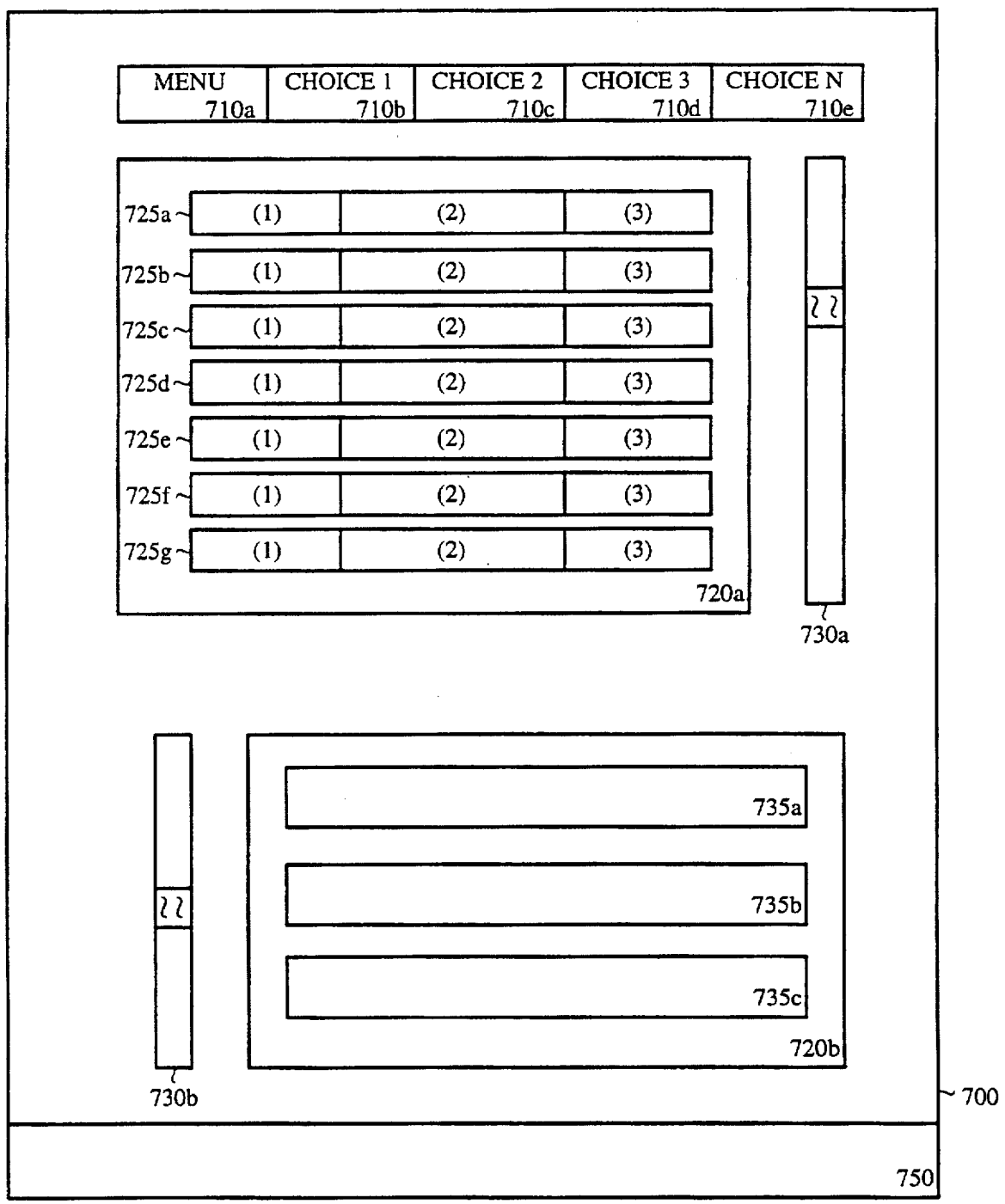
FIG. 14A illustrates a generalized screen display in accordance with the present invention showing a form having blocks with a block having records and fields.

This application event records a selection of the specified menu item from a selection menu. The full path to the item is typically recorded. The first argument is the menu name; the rest of the arguments comprise the path to the selected menu item. In one embodiment, menupath argument(s) consist of internal item names, not the displayed prompts. FIG. 14A illustrates an exemplary menu object comprised of elements 710a-710e. Selection of any displayed menu object is translated into a menuname and a menupath. Example:

MENU CUSTOM QUERY EXECUTE

In one embodiment, the full path to the menu action is typically recorded, regardless of the method of selection (e.g., from the keyboard, mouse, etc.).

[KEY <function_name>]

This application event represents that an indicated function key was pressed and the function_name is the application function that is invoked as a result of the keypress. It is appreciated that if all function keys represent menu items within an exemplary program product, this application event is duplicative with respect to the MENU application event.

Example:

KEY Next_block

[CLICK <form><block><item><record>((MOUSE|KEY) | <choice>)]

This application event represents that a "Click" on the specified item (either with the mouse or via a keyboard equivalent) was performed. This application event represents that a general navigation event occurred where the user transitioned from one active item (e.g., data entry focus) to another, and the application layer 42 needs to be informed of the transition. The presentation layer 40 transmits the data entered into a particular item to the application layer 42 for processing when the user transitions out of the particular item. The click is recorded only if the user actually performs the click. Thus, clicking on a push button, holding the mouse down, dragging it off of the button, and releasing, does not activate the button and does not cause an application event to be recorded.

Upon a navigation from one item to another item, the application layer 42 may be required to perform validation based on information entered in the old item and may be required to perform setup functions for the target item. A validation typically means that the application layer 42 checks that the data (or choice) entered in the old item is within a set of permissible inputs for that item. The permissible set is stored in the data storage layer 44. For example, if the old item represents a US zip code, the validation function checks that the value entered was a number rather than letter text. Some items cannot be entered until prerequisite items are completed. An example setup function checks that the prerequisite item is completed before entry to the target item is allowed. Another example setup function fetches information from the data storage layer 44 because the target item was not previously displayed by the presentation layer 40. In this case, the user navigation caused the presentation layer 40 to perhaps scroll or otherwise update a list of items or lines to display the target item and the application layer 40 is required to provide the information displayed in the new line.

The form, block, item, and record information (for definitions see discussion with respect to FIG. 14A) are one exemplary format used to determine the exact item which was the target of the transition. The <record> argument distinguishes between multiple records of a block. Optionally, the last argument is either the type of click (as MOUSE and KEY clicks can be distinguished for navigation purposes) or the choice selected (for those items with internal values). In one embodiment, the click activates and/or navigates as necessary. The effect, as shown in the below exemplary list of effects, depends on the type of target item:

| Target Item | Effect |
|---|---|
| Push button: | Press the button |
| Check box: | Toggles the state of the check |
| Text Item: | Navigates to the item |
| Image Item: | Activates image |
| Radio button: | Selects the specified [choice] |
| Poplist: | Select [choice] from list |

MOUSE type clicks are recorded when the pointing device (within device 110 of FIG. 5B) is used to click on an item. Navigation is typically assumed. If the target button is navigable, then the button becomes the current item. Note that, for text items, the effect is usually navigation. KEY type clicks are recorded when a button is "pressed" by some keyboard equivalent command. This is distinguished from a MOUSE click because it does not cause navigation to the activated item. In some applications the KEY type click is duplicative. In one embodiment, CLICK events on radio buttons and poplists can include the internal representation of the choice which was made (e.g. store 'Y' not 'Yes').
Examples:

Comment: Press new orders push button CLICK OEX-ENTER ORDER NEW_ORDER MOUSE

Comment: Pick "Shipped" from order state poplist CLICK OEXENTER ORDER ORDSTATE S Comment: Navigate to customer name field CLICK OEX-ENTER ORDER CUSTOMER_NAME

[ACTIVATED <form><block><item><record>[choice]]

Figure 14B:
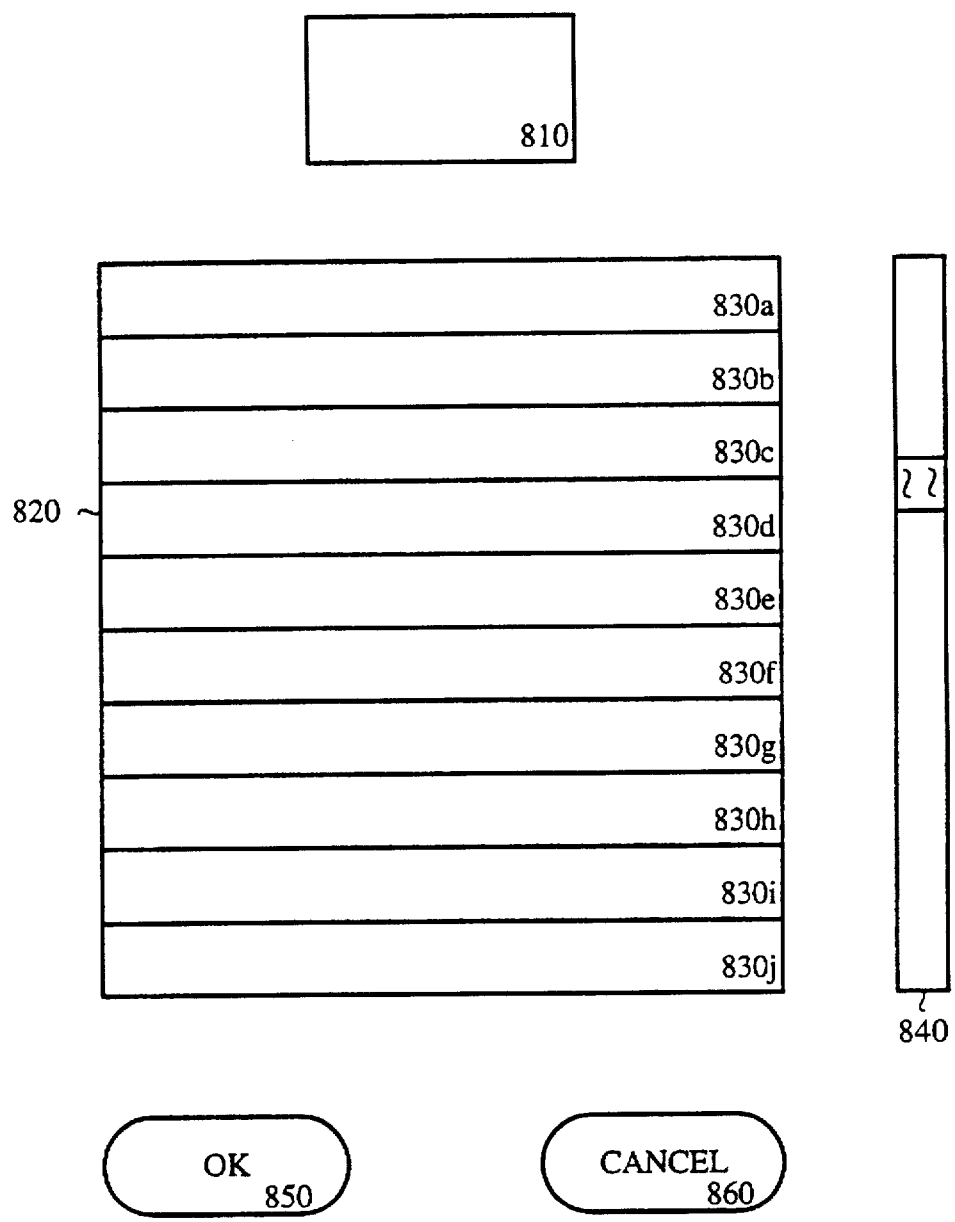
FIG. 14B illustrates a generalized screen display in accordance with the present invention showing a text list of lines.

This application event records when an appropriate item is activated (doubleclick). This application event can be used in selecting a choice from a text-list (T-List). As shown in FIG. 14B, a common data entry user interface object is the text list 820 comprised of several text lines 830a-830j. An object (e.g., mouse) is used to select a particular text line and the text lines can be scrolled (via scroll bar 840). When a text line is selected (e.g., via the mouse and double clicking or using OK button 850), this application event records the selection. The argument "choice" is the text line selected.

[VALUE <form><block><item><record><value>[AUTO_SKIP]]

This application event records that a value (the value arguments) is to be entered into the specified item. This is typically used to record the entry of text into a field. The application layer 42 uses the "value" to perform validation.
Example:

VALUE FNDSCSGN SIGNON USERNAME 1 SYSADMIN An optional AUTO_SKIP flag is used on fields where the auto skip property is enabled and the text entry caused an auto skip to occur. Herein a "field" is used to represent a defined data structure within the application 42 and data storage 44 layers. An "item" is used to represent the expression of a field's data when displayed by the presentation layer 40. The terms "field" and "item" can be used interchangeably to represent a data entry point or focus shown by the presentation layer 40.

[SCROLL <form><block><action>[<record>]]

This application event records that a block (element 720a of FIG. 14A) is being scrolled, e.g., via a block scroll bar (element 730a of FIG. 14A). These actions are distinguished from other types of clicks because there is no item which serves as the target of the action. Scrolling causes record navigation when the current record is scrolled out of view. The above also may require that the application layer 42 fetch additional data from the data storage layer 44 in response. It is appreciated that this application event can be eliminated and replaced with combinations of more abstracted application events such as (1) a general navigation event in combination with (2) a general record fetch application event. Valid actions are:

| Action | Meaning |
| --- | --- |
| PAGE_UP | Scroll block up one page |
| PAGE_DOWN | Scroll block down one page |
| LINE_UP | Scroll block up one record |
| LINE_DOWN | Scroll block down one record |
| GOTO <record> | Scroll so that <record> is at the top |

Example:
SCROLL POXORD ORDER_LINES PAGE_DOWN
[LOV [<choice . . . >]]

Figure 14C:
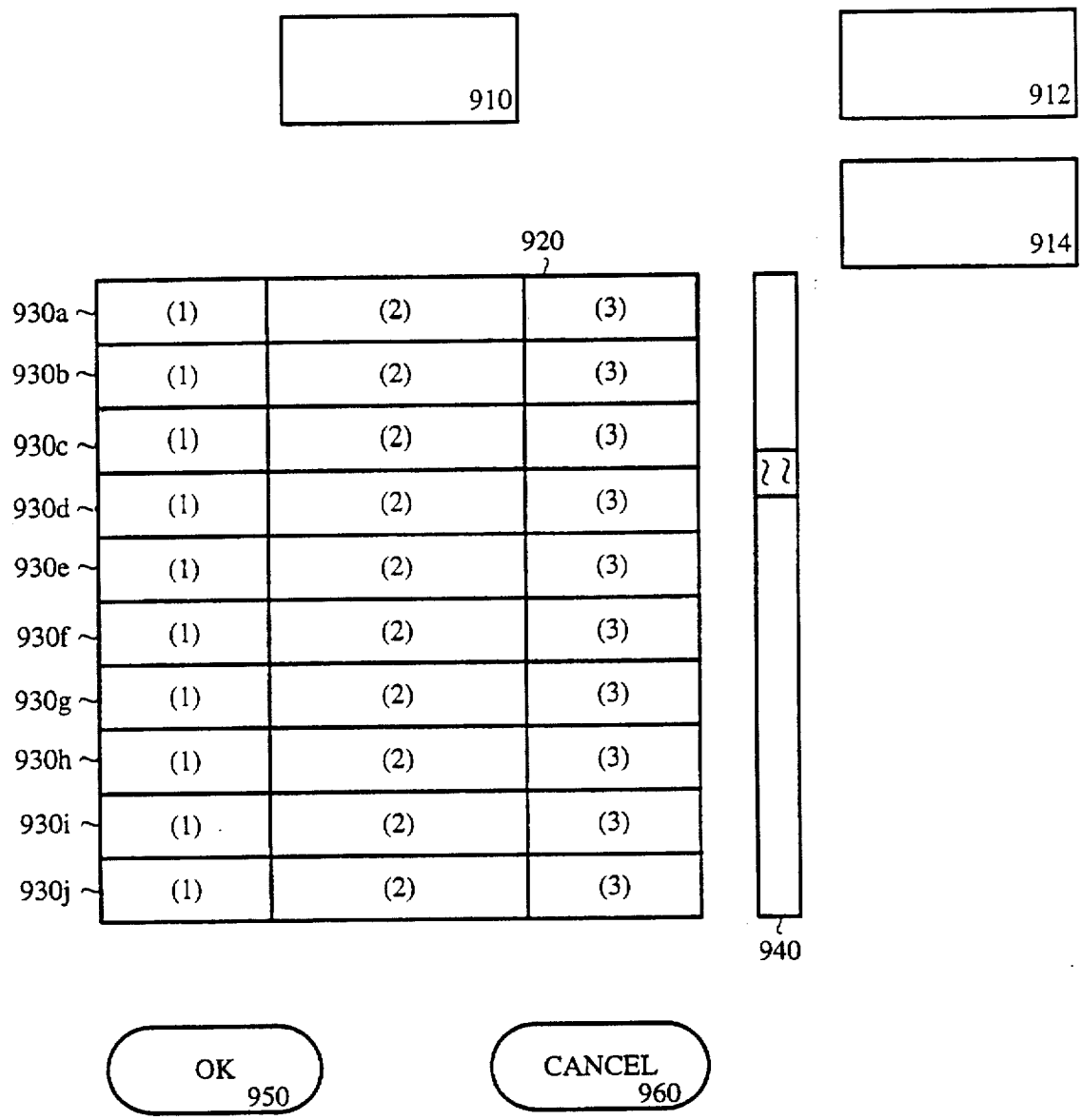
FIG. 14C illustrates a generalized screen display in accordance with the present invention showing a dialog box with multiple items per line.

This application event records an answer to a list of values dialog with the specified choice. This list of values dialog box (e.g., a poplist) typically corresponds to the current field. The choice is recorded as the values of all the columns displayed to the user (one argument per column). For example, FIG. 14C illustrates a list of values dialog box 920 having rows 930a-930j and each row contains three columns. Selection of value (1) within row 930d generates an LOV application event that records all values (1), (2), and (3) of selected row 930d into the <choice> argument. Typically one of the selected values, e.g., (1), is automatically entered into the current field, e.g., field 910. The application layer 42 can optionally enter the other values, e.g., (2) and (3), of selected row 930d into other fields, 912 and 914. In one embodiment, a blank choice indicates that the user pressed "cancel" 960 in response to the dialog box 920. Examples:

Comment: Select "New Mexico" from a list of states LOV "New Mexico""Warm State""Southern State"

Comment: Dismiss an LOV without selecting anything LOV

During playback process 400, the actual row selected is determined by the present invention by matching the available rows against the recorded LOV event values, starting with the first (left most) LOV value, and proceeding to match against successive columns until there is either one or zero matching rows. If no rows uniquely match a subset of LOV event values, an error is reported and process 400 halts. If one row matches the initial LOV values, but does not exactly match all LOV values, it is still accepted as the user choice, and a warning can be recorded in the test state log file 435. It is appreciated that the LOV event does not record (14) that a list was displayed or (2) how the list was presented or (3) what information was within the list. This advantageous feature makes the regression testing system of the present invention less sensitive to changes in descriptive information that can appear in a LOV row, in addition to the unique key. Changes in description information would otherwise create many irreverent mismatches.

In one embodiment, the LOV application event is generally only written if the LOV dialog actually appears before the user when recording. Internal validation performed by the LOV which does not display the dialog typically does not cause an LOV event to be written. During playback process 400, internal LOV validation occur normally by the application layer 42.

[ALERT <choice>]

This application event answers an alert dialog with the specified choice. The alert dialog is typically generated by the application layer 42 in order to obtain specific information needed by the application layer 42. The choice is specified as the label of the button which was pressed. Example:

Comment: Answer "Do you wish to commit . . . " box ALERT OK

Note that this action is read by the software product 48, 48' during test playback process 400, and the input is applied to the alert without actually popping up the box.

[TIMER <name>]

The application layer 42 can request the presentation layer 40 to start a timer. This application event is recorded when the timer expires. During playback process 400, the software product 48, 48' does not actually create and run timers, it simply processes recorded application events as if an actual user timer had signaled. The <name> choice indicates to the application layer 42 which time expired so the appropriate logic within the application 42 is informed.

[NOOP ]

This is a null application event and is not written by the event record step 325 of process 300. When read by the playback process 400, this application event increments the sequence counter, and (as with all input records) causes a state record to be written to the state log file, if any. The application event is useful when manually editing a test because it allows the effective deletion of a test action without requiring the resequencing of all subsequent actions.

[BREAKPOINT ]

This optional application event halts test playback process 400 and returns the software product 48, 48' to normal operating mode. This is useful for diagnosing test failures. Test developers can insert a BREAKPOINT application event into the test playback event file 320. When the playback process 400 encounters the BREAKPOINT command it stops reading test file 320 input. The developer can then operate the software product 48, 48' in a normal manner, presumably to inspect field values, etc. If the BREAKPOINT occurs at a point where a modal window event is expected (such as an LOV or ALERT selection), then the software product 48, 48' displays the LOV or ALERT in normal fashion.

[USER_EXIT [. . . ]]

This is an optional generic action which is intended for use by applications' user-exit windows. As with LOVs and ALERTs, modal windows (flexfields, message boxes, etc.) cannot actually be given control during test playback process 400, since they would halt execution as they waited for input. The USER_EXIT application event stores information necessary to replay the operation of a modal window. USER_EXIT events take the form:

USER_EXIT <command><object name>[<supplemental information>]

The following commands are used:

(1) USER_EXIT MENU <menupath . . . > Select the specified menu item from a user exit menu. Since there is only one menu to choose from, no menu name is needed. The menu path is in this case constructed from menu prompt labels.
(2) USER_EXIT KEY <function_name> Press the indicated function key.
(3) USER_EXIT CLICK <object name> Click on the object with the mouse. Similar to above, CLICK events are context dependent on the object to which they are sent.
(4) USER_EXIT VALUE <object name><value>Set the appropriate object to the value.
(5) USER_EXIT LOV <lov name>[<choice . . . >] Answer a list of values dialog with the specified choice. All displayed columns are written to the event file; a blank choice means the LOV was dismissed.

REFERENCE AND TEST STATE LOG FILE FORMAT

Although the reference state log file 340 and test state log file 435 (the "log files") can be implemented in a number of different well known file formats, in one embodiment of the present invention, these files are implemented in standard ASCII text file format allowing them to be portable, readable and editable. As described with reference to FIG. 8 and FIG. 10, the reference and test state log files 340 and 435 are comprised of series of state difference records, each state difference record corresponding to an individual application event within the test playback event file 320. Each of the log files 340, 435 contains header records and one state record for each processed application event. Error and warning records can optionally appear in files 340, 435 if encountered in processes 300 and 400. The state log files 340 and 435 are written, but never read, by test creation ("record") process 300 and playback process 400. It is appreciated that each state difference record contains any changes in the state of the software program, as represented by the application layer 42 and the data storage layer 44, that resulted from the associated application event.

Although different file format can be utilized within the scope of the present invention, an exemplary file format is presented herein for log files 340, 435. The first lines written to log files 340, 345 contain the date, time, and version information that allows the comparator procedure 500 (FIG. 13) to correctly interpret the remainder of the files.

Comments: state log header Information to follow SYSDATE "17-JAN-1995 13:03:30" VERSION 1

The first sysdate line records the test start time (e.g., the start of process 300 or process 400); each log file terminates with a second sysdate line when the test ends. The two sysdates allow the comparator process 500 to ignore compare differences which are due to the current date. The version information allows the output comparator process 500 to correctly interpret old versions of state files.

The remainder of each log file 340, 435 consists of a series of state difference records. Each state difference record writes only the difference in state of the software program 48, 48' from the previous state difference record (each actively tested software product has a different stored state). The first state difference record for a software product 48, 48' writes the difference in state from the null state (e.g., where all values are NULL/FALSE/0).

Rather than storing the state of the software product 48, 48' using user interface based output (as done in the past), the state difference records of the present invention are recorded in a highly structured format. Although not readily comprehensible by a user, the structured state difference records of the present invention have the advantage that they can readily be searched and compared using sophisticated searching procedures. These procedures can be optimized to efficiently and effectively recognize and ignore a precise sequence or set of informations (stored in ignore file 525) that cause irrelevant mismatches. The highly structured format of the different state record of the present invention is very close in form with the format used to store the data within data storage layer 44. An exemplary state difference record entry has the following format as shown in Table II.

TABLE II

Comments: <sequence> – <current focus> – <event type>
FORM <name>
  CURBLOCK   <name>
  CURFIELD   <name>
  ENTQUERY   <TRUE | FALSE>
  STATUS   <NEW | INSERT | QUERY | CHANGED>
  MESSAGE   "last displayed message text"
  BLOCK <name>
    RECCOUNT   <number>
    TOPREC   <number>
    CURREC   <number>
    STATUS   <NEW | INSERT | QUERY | CHANGED>
    RECSTATUS   <NEW | INSERT | QUERY | CHANGED>
    FIELD <name>
      VALUE   ". . ."
      TYPE   <CHAR | DATE | NUMBER | . . . >
      CANVAS   <canvas_name>
      GEOMETRY   <x>, <y>: <wd>, <ht>
      MANDATORY   <TRUE | FALSE>
      DISPLAYED   <TRUE | FALSE>
      ENABLED   <TRUE | FALSE>
      NAVIGABLE   <TRUE | FALSE>

TABLE II-continued

```
        INSERTABLE    <TRUE | FALSE>
        QUERYABLE     <TRUE | FALSE>
        UPDATEABLE    <TRUE | FALSE>
        UPDATENULL    <TRUE | FALSE>
     FIELD
  BLOCK
END
```

Within the exemplary state difference record there are two types of lines, context lines which specify the object to which the following state lines are referring (e.g., FORM, BLOCK, FIELD) and state lines which specify the value of a particular attribute of the context object's state (e.g., VALUE, TYPE, etc.). Each state difference record writes differences from the previous record, therefore only state lines which have changed are written to the applicable log file. Context lines are written as necessary to specify the object whose state is being written. Example:

Comment: Value of ORDER.CUSTOMER_NAME changed since last event

```
        Comment: 2 - VALUE
        FORM ORDENTER
           BLOCK ORDER
              FIELD CUSTOMER_NAME
                 VALUE "John Smith"
        END
```

Within the state difference record, CURBLOCK and CURFIELD indicate the current entry focus (e.g., currently selected field) of the software product 48, 48'. ENTQUERY true indicates that the software product is in the enter query mode where the data input to a particular field is to be used as a restriction to set up conditions for a query of the information in the data storage layer 44. ENTQUERY false indicates that the software product is in a data entry mode where data entered to a field is used to update the information of the data storage layer 44. STATUS indicates the current status of the software product (e.g. "form"). New indicates that the product was just initialized, e.g., called up, and no information transferred into or out of the product. Insert indicates that information was last inserted into the product. Query indicates that information is in the product and this information was last queried. Changed indicates that a query was performed and information was amended. MESSAGE indicates information located within a message field (field 750 of FIG. 14A) of a form or block of the software product.

A software product 48, 48' may contain many forms. Within the present invention an individual "form" or a group of "forms" can be understood as the software product 48, 48' itself. For each block within each FORM, a block subrecord is maintained within the state difference record that contains the corresponding block name. Within the block subrecord, RECCOUNT maintains a number of the records within the block. TOPREC indicates the record number that is on top of the viewable list of records as requested by the presentation layer 40. CURREC indicates the record number that is currently the focus of the user. STATUS indicates the status of the block subrecord and is analogous to the STATUS information discussed above. RECSTATUS indicates status of the current record and is analogous to the STATUS information discussed above.

For each field within each block of the software product 48, 48', a field subrecord is maintained within the state difference record of the present invention. Within the field subrecord, VALUE indicates a new value that was input to the corresponding named field. TYPE indicates the attribute or format of the value, e.g., character data, date information, a number, etc. CANVAS is an optional indication and indicates the different display windows that the field can exist within in the presentation layer of the software product. GEOMETRY indicates the relative presentation (e.g., screen, hardcopy) position of the field within each canvas for which the field is defined. MANDATORY indicates whether or not this field requires mandatory data entry (e.g., entry of a value is required for the record). DISPLAYED indicates whether or not this field is allowed to be displayed to the user via the presentation layer 40. ENABLED indicates whether or not the user can input data into the field or is it "grayed out" (e.g., displayed but not able to accept data). NAVIGABLE indicates whether or not the field can be entered, but its display is normal. INSERTABLE indicates whether or not the field is able to accept new data from a current null state. QUERYABLE indicates whether or not this field can be used as a query restriction to perform a search. UPDATEABLE indicates whether or not the data in this field can be altered. UPDATENULL true indicates that this field can only be updated if it is currently empty (null state).

IGNORE FILE 525 FORMAT AND GENERATION

Within the present invention, state log files (e.g., log file 340, 435) are generated and compared using process 500 (FIG. 10) which reports any detected differences between the reference state log file 320 and the test state log file 435. The state log files 320, 435 are very structured, allowing for fine-grained comparison of the state of the application layer 42 and the data storage layer 44. The compare process 500 can be configured with complex difference ignore commands stored within an ignore file 525. An exemplary format of the commands within the ignore file 525 of the present invention is presented below (commands are in brackets):

[IGNORE form[:block[.field]][->member]]

This command indicates to process 500 that it does not compare state differences for the named object. Examples:

Comments: Ignore everything in the toolbar block IGNORE fndfmfbf:toolbar

Comments: Ignore description field IGNORE fndfmfbf:fnd_form.description

Components of an object name can be a LIKE pattern, the ignore applies to all instances that match the pattern. Examples (%=all):

Comments: Ignore all rowid fields IGNORE %:%.ROWID

Comments: Ignore record count for all blocks IGNORE %:%->RECCOUNT

Comments: Ignore geometry values for all fields IGNORE %:%.%->GEOMETRY

[COMPARE form[:block[.field]][->member]]

This command is similar to the IGNORE command, but explicitly includes an object for comparison. Therefore, it overrides the ignore command. This command can be used in conjunction with IGNORE to ignore all but a small set of objects:

Comments: Ignore all dates except creation date IGNORE fndfmfbf:%.%date%    COMPARE fndfmfbf:%.creation_date

[TRANSLATE[form[:block[.field]]->member]<from_expr><to _expr>]

This command causes a translation of the value of an object member that matches the "from" expression LIKE pattern to the string specified by the "to" expression. The translation is performed on the state logs before it is compared for differences. The "from" string can contain embedded special symbols of the following types:

| From Expression | Meaning |
| --- | --- |
| <variable> | value of environment variable |
| <SYSDATE:format> | current or next date in specified format |

The "to" expression is a string which can optionally contain an embedded expression of the following types:

| To Expression | Meaning |
| --- | --- |
| (beg,end) | "from" value substring ($=end of string) |

The translate facility can be used to selectively ignore certain information that cause volumes of mismatches, e.g., current date or time while still trapping errors for non-sysdate values. Examples:

Comments: compare only first 5 characters of extended zip code TRANSLATE myform:client.zip->VALUE "___-%" (1,5)

Comments: Ignore sysdate comparison errors for %date% fields TRANSLATE %:%.%date%->VALUE <SYSDATE:DD-MON-YY>x Comments: Ignore sysdate with time TRANSLATE %:%.%date%->VALUE "<SYSDATE:DD-MON-YY>%:%" x

PROGRAM ("FORM"), BLOCK, RECORD, FIELD

FIG. 14A illustrates several objects that are discussed above with respect to an exemplary database application of the software program under test. FIG. 14A is a visualization of information presented to a user by presentation layer 40. A database software program may contain many forms 700. A form 700 represents an area that contains individual blocks. Blocks 720a and 720b are illustrated as display areas that contain records and fields. Records can be displayed as lines of text and are shown as 725a–725g and 735a–735c. A record can be divided into columns, e.g., (1), (2), (3), as shown. Each column of a record can be a field. Fields typically represent a focus where data can be entered into the application layer 42. Information displayed within a field is called an item.

BATCH FILE PROCESSING USING TEST SUITES

The present invention regression testing system is well suited for use on individual tests, as described above. However, another effective use of the regression testing system of the present invention applies a series of prerecorded test playback event files 320 to a software product 48, 48' or group of software products. The present invention provides a batch processor for automatically opening a test suite and: (1) generating reference state log files 340, e.g., executing process 400 based on an existing test playback file 320 to generate file 340; (2) applying a group of prerecorded test playback event files 320 to the software products for testing, e.g., executing process 400 multiple times; (3) performing the required comparison between the state log files, e.g., executing process 500 multiple times; (4) controlling the comparison with comparison ignore files; and (5) maintaining the error log files (e.g., created by step 535 of process 500). Based on the above, the batch processor is principally an automated system for test playback. An exemplary batch command syntax is shown below:

batch <appsname><testname> [GEN|RUN|COMP|RCOMP|COPY]

Where appsname represents the software product 48, 48' to test and testname is the name of the test suite (e.g. set of tests) used in conjunction with the software product. The next argument specifies the mode of operation:

| | Mode |
| --- | --- |
| GEN | Execute Process 300 to generate new reference state log files 435 based on existing file 320. |
| RUN | Run tests and make test files (Do not execute compare process 500) |
| COMP | Compare existing test and reference state log files 340,435 (Do not run tests) |
| RCOMP | Playback process 400 and then Compare process 500 |
| COPY | Copy current test state log files onto reference test state log files |

Based on an existing test playback event file 320, GEN mode is used to create new reference state log files 340 to serve as a reference for later RUNs. In RUN mode, the test playback event file 320 is run to produce test state log file 435 which is to be compared with the reference state log file 340. In COMP mode, only the comparison process 500 is run, on existing reference 435 and test 340 state log files. Test playback event file 320 is not actually played. RCOMP is the combination of both RUN and COMP modes, with each test being individually run and then compared. COPY mode copies the current test state log file 435 over the reference state log file 340, thereby making the last run the new reference point.

The batch processor obtains its commands from test suite files indicated in the above syntax. The present invention batch processor groups the many files and processes associated with single test under one name (e.g., <testname>), and similarly, allows many tests to be grouped into a suite which is also identified by a name. To do so, the present invention batch processor automatically constructs file names based on the test name and a naming convention for extensions. The following convention is used:

| File type | .EXT | Written | Read |
| --- | --- | --- | --- |
| Suite | | | |
| A test set | .tsi | developer | batch processor |
| Comparator output for entire suite | .tso | process 500 | developer |
| Individual | | | |
| Test playback event file 320 | .tfi | process 300 | process 400 |
| Reference state log file 340 | .tfr | process 300 | process 500 |
| Test state log file 435 | .tfp | process 400 | process 500 |
| Comparator control (file 525) | .tfc | developer | process 500 |
| Comparator output (error log file of step 535) | .tfo | process 500 | developer |

Based on the conventions given above and its input arguments, the batch processor is given all the information it required to automatically generate the command line syntax required to invoke processes 300, 400, 600 and 500.

Suite Input File Format (.tsi) Suite files contain commands that are processed sequentially by the batch processor. Commands which execute named tests (or suites) can optionally pre-pend an application short name to the test name, to reference tests which belong to other applications. The suite file has the following exemplary format shown below with commands in brackets. For all following commands, <appsname> is the application short name and <name> is the test name, without extension:

[FORM[<appsname>:]<name>]

This command causes playback of the appsname software product 48, 48' in conjunction with a test called <name>. The batch processor waits for the test and any resultant concurrent requests to complete before proceeding to the next batch command. When the batch processor is in GEN mode, this command causes batch processor to construct the proper command line syntax for process 400 to execute to generate a new reference state log file 340 based on an existing test playback file (e.g., name.tfi). In GEN mode, the reference state log file 340 is written to the .tfr file. In RUN mode, process 400 is executed and the test state log file 435 is written to the .tfp file. If COMP mode is on, the .tfr and .tfp files are be compared by process 500, controlled by the .tfc file (file 525) with differences written to the .tfo file (the error log file of step 535). All required command line syntax is automatically generated by the batch processor. Within this command, the following files are read or written depending on the mode of the batch processor:

|            | GENERATE | RUN | COMPARE |
|------------|----------|-----|---------|
| <name>.tfi | R        | R   |         |
| <name>.tfr | W        |     | R       |
| <name>.tfp |          | W   | R       |
| <name>.tfc |          |     | R       |
| <name>.tfo |          |     | W       |
| global.tfc |          |     | R       |

[SUITE [<appsname>:]<name>]

This command causes the batch processor to recursively open the <name>.tsi suite file and begin processing. When the sub-suite is finished, processing resumes with the next command in the master suite. The following files are used by this command:

|            | GENERATE | RUN | COMPARE |
|------------|----------|-----|---------|
| <name>.tsi | R        | R   |         |
| <name>.tso |          |     | W       |

[FAILURES <number>]

This command sets the number of test failures to allow before aborting the execution of the suite. The batch processor detects test failures because explicit failure statements generated from process 400 can be recorded into the state log files 435. A failure is also counted if the test exceeds the maximum number of comparison differences (see below).

[DIFFERENCES <number>]

This command sets the maximum error count value used in step 540 of process 500 (FIG. 13). This value represents the number of comparison differences to allow before giving up the comparison process 500. A test exceeding this limit is counted as a failure. This command is significant in COMP and RCOMP modes.

It is appreciated that although the batch processor and the above identified file formats provide effective batch processing features for the present invention, the present invention regression testing system can operate effectively without these items.

CONCLUSION

The preferred embodiment of the present invention, an application event recorder and playback system directly coupled to the application layer of a software product for regression testing, is thus described. While the present invention has been described in particular embodiments, it should be appreciated that the present invention should not be construed as limited by such embodiments, but rather construed according to the below claims.

What is claimed is:

1. In a computer system having a processor and a computer readable memory, a method of performing a regression test comprising the computer implemented steps of:
   a) recording detected application events into a playback event file, said application events originating from a presentation layer and passed to an application layer of a first version of a software program;
   b) recording a first response of said first version of said software program to said application events and storing said first response in said computer readable memory;
   c) replaying said playback file and directly applying said application events stored therein to an application layer of a second version of said software program;
   d) recording a second response, said second response being a response of said application layer of said second version of said software program to said application events recorded by step a); and
   e) determining differences between said first and second versions of said software program by comparing said first response and said second response and determining differences therein.

2. A method as described in claim 1 wherein said step b) comprises the steps of:
   sequentially applying said application events received from said presentation layer to said application layer of said first version of said software program;
   recording a respective previous state of said first version of said software program before application of each application event thereto;
   recording a respective current state of said first version of said software program after application of each application event thereto;
   generating a respective state difference record for each application event by comparing each current state with each previous state and recording differences therein; and
   storing each state difference record into a reference state log file as said first response.

3. A method as described in claim 2 wherein said step d) comprises the steps of:
   sequentially applying said application events of said playback event file to said application layer of said second version of said software program;
   recording a respective previous state of said second version of said software program before application of each application event thereto;
   recording a respective current state of said second version of said software program after application of each application event thereto;
   generating a respective state difference record for each application event by comparing each current state of said second version of said software program with each previous state of said second version of said software program and recording differences therein; and
   storing each state difference record into a test state log file as said second response.

4. A method as described in claim 1 wherein said step a) comprises the steps of:

monitoring identified communication pathways that couple said presentation layer to said application layer of said first version of said software program to detect application events communicated to said application layer; and recording said application events detected within said communication pathways.

5. A method as described in claim 4 wherein said step c) comprises the steps of:

accessing said playback event file to retrieve application events recorded therein; and applying said application events through said communication pathways to said application layer of said second version of said software program without interaction with a presentation layer of said second version of said software program.

6. A method as described in claim 1 wherein said step b) comprises the steps of:

generating a plurality of state difference records representative of said first response; and representing information of each state difference record in a highly structured format that closely resembles a format used by said first version of said software program to internally represent information.

7. A method as described in claim 1 wherein said step d) comprises the steps of:

generating a plurality of state difference records representative of said second response; and representing information of each state difference record in a highly structured format that closely resembles a format used by said second version of said software program to internally represent information.

8. A method as described in claim 1 wherein said step b) comprises the step of recording a plurality of state difference records as said first response, a respective state difference record of said first response recorded for each application event originating from said presentation layer, and wherein said step d) comprises the step of recording a plurality of state difference records as said second response, a respective state difference record of said second response recorded for each application event originating from said playback event file, and wherein said step e) comprises the step of individually comparing respective state difference records of same application events to determine differences between said first response and said second response.

9. A method as described in claim 8 wherein said step e) comprises the steps of:

receiving an ignore file comprising a sequence of ignore commands which identify information that produces irrelevant mismatches between said first response and said second response; and ignoring differences between said respective state difference records of same application events provided said differences are identified within said ignore file.

10. In a computer system, a method of performing a regression test comprising the computer implemented steps of:

a) recording application events into a playback event file, said application events originating from a presentation layer of a first version of a software program and passed to an application layer of said first version of said software program;

b) recording a response of said first version of said software program to said application events and storing said response as a reference state log file in a computer readable memory wherein said reference state log file comprises a plurality of state difference records, a respective state difference record recorded for each application event originating from said presentation layer;

c) replaying said playback event file and directly applying said application events stored therein to an application layer of a second version of said software program;

d) in response to step c), recording a response of said application layer of said second version of said software program to said application events and storing said response as a test state log file in said computer readable memory, wherein said test state log file comprises a plurality of state difference records, a respective state difference record recorded for each application event; and e) determining differences between said first and second version of said software program by comparing said reference state log file and said test state log file and determining differences therein.

11. A method as described in claim 10 wherein said step b) comprises the steps of:

sequentially applying said application events from said presentation layer to said application layer of said first version of said software program;

determining a respective previous internal state of said first version of said software program before application of each application event thereto;

determining a respective current internal state of said first version of said software program after application of each application event thereto; and generating a respective state difference record with respect to each application event by comparing each current internal state with each previous internal state and recording differences therein.

12. A method as described in claim 11 wherein said step d) comprises the steps of:

sequentially applying said application events from said playback event file to said application layer of said second version of said software program;

determining a respective previous internal state of said second version of said software program before application of each application event thereto;

determining a respective current internal state of said second version of said software program after application of each application event thereto; and generating a respective state difference record with respect to each application event by comparing each current internal state of said second version of said software program with each previous internal state of said second version of said software program and recording differences therein.

13. A method as described in claim 10 wherein said step a) comprises the steps of:

monitoring identified communication pathways that couple said presentation layer to said application layer of said first version of said software program to detect application events communicated to said application layer of said first version of said software program; and recording said application events detected within said communication pathways.

14. A method as described in claim 13 wherein said step c) comprises the steps of:

accessing said playback event file to retrieve application events recorded therein; and

29 applying said application events through said communication pathways to said application layer of said second version of said software program without interaction with a presentation layer of said second version of said software program.

15. A method as described in claim 10 wherein information within each state difference record is stored in a highly structured format that closely resembles a format used by said first and second versions of said software program to internally represent information.

16. A method as described in claim 10 wherein said step e) comprises the steps of:

individually comparing respective state difference records of same application events to determine differences between said reference state log file and said test state log file;

receiving an ignore file comprising a sequence of ignore commands which identify information that produces irrelevant mismatches between said reference state log file and said test state log file; and ignoring differences between said respective state difference records of same application events provided said differences are identified within said ignore file.

17. A computer system comprising:

a processor;

an address/data bus coupled to said processor;

a computer readable memory coupled to communicate with said processor;

said processor for performing step a) of recording application events to a playback event file, said application events originating from a presentation layer of a first version of a software program and passed over a communication pathway to an application layer of said first version of said software program;

said processor for performing step b) of recording a first response of said first version of said software program to said application events and storing said first response in said computer readable memory;

said processor for performing step c) of replaying said playback file and directly applying said application events stored therein to an application layer of a second version of said software program;

said processor for performing step d) of recording a second response, said second response being a response of said application layer of said version of said second software program to said application events; and said processor for also performing step e) of determining differences between said first and second versions of said software program by comparing said first response and said second response and determining differences therein.

18. A computer system as described in claim 17 wherein said processor performs said step b) by:

said processor sequentially applying said application events to said application layer of said first version of said software program;

said processor recording a respective previous internal state of said first version of said software program before application of each application event thereto;

said processor recording a respective current internal state of said first version of said software program after application of each application event thereto;

said processor generating a respective state difference record for each application event by comparing each

30 current internal state with each previous internal state and recording differences therein; and said processor storing each state difference record into a reference state log file as said first response.

19. A computer system as described in claim 18 wherein said processor performs said step d) by:

said processor sequentially applying said application events of said playback event file to said application layer of said second version of said software program;

said processor recording a respective previous internal state of said second version of said software program before application of each application event thereto;

said processor recording a respective current internal state of said second version of said software program after application of each application event thereto;

said processor generating a respective state difference record for each application event by comparing each current internal state of said second version of said software program with each previous internal state of said second version of said software program and recording differences therein; and said processor storing each state difference record into a test state log file as said second response.

20. A computer system as described in claim 17 wherein said processor performs said step c) by:

said processor accessing said playback event file to retrieve application events recorded therein; and said processor applying said application events through said communication pathways to said application layer of said second version of said software program without interaction with a presentation layer of said second version of said software program.

21. A computer system as described in claim 17 wherein said processor performs said step b) by said processor generating a plurality of state difference records representative of said first response, and wherein said processor performs said step d) by generating a plurality of state difference records representative of said second response, and wherein information within each state difference record is represented in a highly structured format that closely resembles a format used by said first and second versions of said software program to internally represent information.

22. A computer system as described in claim 17 wherein said processor performs said step b) by recording a plurality of state difference records as said first response, a respective state difference record of said first response recorded for each application event originating from said presentation layer, wherein said processor performs said step d) by recording a plurality of state difference records as said second response, a respective state difference record of said second response recorded for each application event originating from said playback event file, and wherein said processor performs said step e) by:

said processor individually comparing respective state difference records of same application events to determine differences between said first response and said second response;

said processor receiving an ignore file comprising a sequence of ignore commands which identify information that produces irrelevant mismatches between said first response and said second response; and said processor ignoring differences between said respective state difference records of same application events provided said differences are identified within said ignore file.

23. In a computer system having a processor coupled to a bus, a computer readable memory for communicating with said processor and containing a sequence of instructions for causing said computer system to perform a regression test, said regression test comprising the steps of:

a) recording application events to a playback event file, said application events originating from a presentation layer of a first version of said software program and passed to an application layer of said first version of said software program;

b) recording a first response of said first version of said software program to said application events and storing said first response;

c) replaying said playback file and directly applying said application events stored therein to an application layer of a second version of said software program;

d) in response to step c), recording a response of said application layer of said second version of said software program to said application events as a second response; and e) determining differences between said first and second versions of said software program by comparing said first response and said second response to determine differences therein.

24. A computer readable memory as described in claim 23 wherein said step b) comprises the steps of:

sequentially applying said application events to said application layer of said first version of said software program;

recording a respective previous internal state of said first version of said software program before application of each application event thereto;

recording a respective current internal state of said first version of said software program after application of each application event thereto;

generating a respective state difference record for each application event by comparing each current internal state with each previous internal state and recording differences therein; and storing each state difference record into a reference state log file as said first response.

25. A computer readable memory as described in claim 24 wherein said step d) comprises the steps of:

sequentially applying said application events of said playback event file to said application layer of said second version of said software program;

recording a respective previous internal state of said second version of said software program before application of each application event thereto;

recording a respective current internal state of said second version of said software program after application of each application event thereto;

generating a respective state difference record for each application event by comparing each current internal state of said second version of said software program with each previous internal state of said second version of said software program and recording differences therein; and storing each state difference record into a test state log file as said second response.

26. A computer readable memory as described in claim 23 wherein said step a) comprises the steps of:

monitoring identified communication pathways that couple said presentation layer to said application layer of said first version of said software program to detect application events communicated to said application layer of said first version of said software program; and recording said application events detected within said communication pathways.

27. A computer readable memory as described in claim 26 wherein said step c) comprises the steps of:

accessing said playback event file to retrieve application events recorded therein; and applying said application events through said communication pathways to said application layer of said second version of said software program without interaction with a presentation layer of said second version of said software program.

28. A computer readable memory as described in claim 23 wherein said step b) comprises steps of:

generating a plurality of state difference records representative of said first response; and representing information of each state difference record in a highly structured format that closely resembles a format used by said first version of said software program to internally represent information.

29. A computer readable memory as described in claim 23 wherein said step d) comprises the steps of:

generating a plurality of state difference records representative of said second response; and representing information of each state difference record in a highly structured format that closely resembles a format used by said second version of said software program to internally represent information.

30. A computer readable memory as described in claim 23 wherein said step b) comprises the step of recording a plurality of state difference records as said first response, a respective state difference record of said first response recorded for each application event originating from said presentation layer, and wherein said step d) comprises the step of recording a plurality of state difference records as said second response, a respective state difference record of said second response recorded for each application event originating from said playback file, and wherein said step e) comprises the steps of:

individually comparing respective state difference records of same application events to determine differences between said first response and said second response;

receiving an ignore file comprising a sequence of ignore commands which identify information that produces irrelevant mismatches between said first response and said second response; and ignoring differences between said respective state difference records of same application events provided said differences are identified within said ignore file.

* * * * *